(12) United States Patent
Shivnaraine et al.

(10) Patent No.: US 10,430,783 B2
(45) Date of Patent: Oct. 1, 2019

(54) TRANSMIT PHASE DETECTION CIRCUIT

(71) Applicant: Square, Inc., San Francisco, CA (US)

(72) Inventors: Ravi Shivnaraine, Brampton (CA); Emad Bidari, Toronto (CA); Alain Rousson, Toronto (CA); Yue Yang, Thornhill (CA); Kajornsak Julavittayanukool, Toronto (CA); Afshin Rezayee, Richmond Hill (CA)

(73) Assignee: Square, Inc., San Francisco, CA (US)

( * ) Notice: Subject to any disclaimer, the term of this patent is extended or adjusted under 35 U.S.C. 154(b) by 508 days.

(21) Appl. No.: 15/283,520

(22) Filed: Oct. 3, 2016

(65) Prior Publication Data

US 2018/0096341 A1    Apr. 5, 2018

(51) Int. Cl.
| | | |
|---|---|---|
| *H04B 5/00* | (2006.01) | |
| *G06Q 20/32* | (2012.01) | |
| *G06K 7/10* | (2006.01) | |
| *G01R 25/00* | (2006.01) | |
| *G01R 25/04* | (2006.01) | |
| *G06K 19/07* | (2006.01) | |

(52) U.S. Cl.
CPC ....... *G06Q 20/3278* (2013.01); *G01R 25/005* (2013.01); *G01R 25/04* (2013.01); *G06K 7/10366* (2013.01); *G06K 19/0723* (2013.01); *H04B 5/0056* (2013.01)

(58) Field of Classification Search
CPC ....................................................... H04B 5/00
See application file for complete search history.

(56) References Cited

U.S. PATENT DOCUMENTS

| | | |
|---|---|---|
| D284,084 S | 6/1986 | Ferrara, Jr. |
| D289,291 S | 4/1987 | Kapper |
| 4,788,420 A | 11/1988 | Chang et al. |
| D309,296 S | 7/1990 | Kohler |
| D321,172 S | 10/1991 | Moore, IV et al. |

(Continued)

FOREIGN PATENT DOCUMENTS

| | | |
|---|---|---|
| CA | 2 465 651 A1 | 5/2003 |
| CA | 2 842 057 A1 | 1/2013 |

(Continued)

OTHER PUBLICATIONS

International Search Report and Written Opinion for International Application No. PCT/US2017/054929, dated Dec. 21, 2017.

(Continued)

*Primary Examiner* — Ankur Jain
(74) *Attorney, Agent, or Firm* — Maynard Cooper & Gale, P.C.; Brian T. Sattizahn, Esq.

(57) ABSTRACT

A payment reader includes a tuning circuit that provides a tuned transmission source signal to an antenna for transmission. A sense circuit coupled to the antenna provides a measured transmitted signal to a binary phase detection circuit. The binary phase detection circuit filters and processes the signal to provide an analog phase signal that corresponds to a phase difference between the measured transmitted signal and the transmission source signal. A comparison circuit compares the analog phase signal to a reference signal, and a decision circuit adjusts the operation of the transmission circuitry based on the comparison.

30 Claims, 9 Drawing Sheets

(56) References Cited

U.S. PATENT DOCUMENTS

| | | |
|---|---|---|
| D326,847 S | 6/1992 | Savio |
| D327,472 S | 6/1992 | Martin |
| D327,877 S | 7/1992 | Martin |
| D338,452 S | 8/1993 | Allgeier |
| D338,876 S | 8/1993 | Nair et al. |
| D340,919 S | 11/1993 | Lee |
| D342,239 S | 12/1993 | Hermann |
| D342,240 S | 12/1993 | Saillant |
| D346,794 S | 5/1994 | Arakaki et al. |
| 5,321,369 A * | 6/1994 | Wolaver ............... H03D 13/003 327/259 |
| D348,449 S | 7/1994 | Rodd et al. |
| D355,437 S | 2/1995 | Reph |
| D372,730 S | 8/1996 | Sasaki |
| D386,781 S | 11/1997 | Sasaki |
| D390,836 S | 2/1998 | Takahashi |
| D397,682 S | 9/1998 | Yotukura |
| D409,650 S | 5/1999 | Hanna et al. |
| 5,987,075 A | 11/1999 | Abe et al. |
| D423,470 S | 4/2000 | Neifer et al. |
| D424,098 S | 5/2000 | Kim |
| D425,800 S | 5/2000 | Shin |
| D428,046 S | 7/2000 | Berger |
| D451,535 S | 12/2001 | Lee |
| 6,340,932 B1 | 1/2002 | Rodgers et al. |
| D458,600 S | 6/2002 | Freitag et al. |
| D467,584 S | 12/2002 | Sabella et al. |
| 6,539,316 B1 * | 3/2003 | Doten ..................... A61B 8/06 702/33 |
| D472,898 S | 4/2003 | Adams |
| D477,321 S | 7/2003 | Baughman |
| D483,371 S | 12/2003 | Johnston |
| D486,176 S | 2/2004 | Flaherty et al. |
| D489,325 S | 5/2004 | Nakamura |
| D496,658 S | 9/2004 | Koloski et al. |
| D501,208 S | 1/2005 | Ozolins et al. |
| D501,853 S | 2/2005 | Koloski et al. |
| D502,727 S | 3/2005 | Slinckx |
| D504,147 S | 4/2005 | Slinckx |
| D508,245 S | 8/2005 | Ozolins et al. |
| 7,054,595 B2 | 5/2006 | Bann |
| D524,448 S | 7/2006 | Telimaa et al. |
| D525,282 S | 7/2006 | Barnes et al. |
| D526,002 S | 8/2006 | Nakajima et al. |
| D527,760 S | 9/2006 | Ono |
| D529,073 S | 9/2006 | Ono |
| D535,994 S | 1/2007 | Leibenguth |
| D536,726 S | 2/2007 | Ono |
| 7,197,279 B2 | 3/2007 | Bellantoni |
| D539,797 S | 4/2007 | Chiang et al. |
| D542,791 S | 5/2007 | Fitch et al. |
| D544,903 S | 6/2007 | Henry et al. |
| D547,361 S | 7/2007 | Henry |
| D553,669 S | 10/2007 | Henry et al. |
| D554,640 S | 11/2007 | Ponnert et al. |
| D558,765 S | 1/2008 | Fitler et al. |
| D561,243 S | 2/2008 | Dahl |
| 7,433,185 B1 | 10/2008 | Curran et al. |
| D580,383 S | 11/2008 | Kuramashi |
| 7,525,438 B2 | 4/2009 | Hyde et al. |
| D592,658 S | 5/2009 | Sugiyama et al. |
| D594,055 S | 6/2009 | Hagiwara et al. |
| D596,626 S | 7/2009 | Andre et al. |
| D601,585 S | 10/2009 | Andre et al. |
| D604,298 S | 11/2009 | Fowler et al. |
| D606,545 S | 12/2009 | Salmon |
| D611,223 S | 3/2010 | Kuhn |
| 7,689,195 B2 | 3/2010 | Wu et al. |
| D613,283 S | 4/2010 | Andre et al. |
| D615,120 S | 5/2010 | Ono |
| D615,543 S | 5/2010 | Padilla et al. |
| D615,583 S | 5/2010 | Ono |
| D621,397 S | 8/2010 | Andre et al. |
| D624,115 S | 9/2010 | Ausems et al. |
| D628,576 S | 12/2010 | Daniel |
| D631,042 S | 1/2011 | Chen |
| D632,328 S | 2/2011 | Dahl |
| D638,012 S | 5/2011 | Tian et al. |
| D638,019 S | 5/2011 | Weisshaupt |
| 7,949,567 B2 | 5/2011 | Lum |
| D639,301 S | 6/2011 | Anderson et al. |
| D641,776 S | 7/2011 | Race |
| D648,336 S | 11/2011 | Yagi |
| D648,373 S | 11/2011 | Hidaka |
| D649,153 S | 11/2011 | Symons |
| D655,293 S | 3/2012 | Gioscia et al. |
| D657,784 S | 4/2012 | Akana et al. |
| D657,791 S | 4/2012 | Kim et al. |
| D661,305 S | 6/2012 | Andre et al. |
| D662,089 S | 6/2012 | Gougherty et al. |
| D664,144 S | 7/2012 | Akana et al. |
| D665,011 S | 8/2012 | Takahashi |
| D665,383 S | 8/2012 | McManigal et al. |
| D669,888 S | 10/2012 | Gougherty et al. |
| D672,386 S | 12/2012 | Matunuma et al. |
| D673,152 S | 12/2012 | Bousfield et al. |
| D673,952 S | 1/2013 | Toda et al. |
| D675,617 S | 2/2013 | Daniel |
| D676,900 S | 2/2013 | Ohno et al. |
| D681,036 S | 4/2013 | Taunay da Graca Couto |
| D681,639 S | 5/2013 | Cruz et al. |
| D682,273 S | 5/2013 | Taunay da Graca Cuoto |
| D682,285 S | 5/2013 | Skinner et al. |
| D682,830 S | 5/2013 | Taunay da Graca Couto |
| D683,141 S | 5/2013 | Symons |
| D684,574 S | 6/2013 | Taunay da Graca Couto |
| D684,944 S | 6/2013 | Seong |
| D684,970 S | 6/2013 | Zhang |
| 8,472,560 B2 | 6/2013 | Rezayee et al. |
| D687,036 S | 7/2013 | Seong et al. |
| D687,484 S | 8/2013 | Eun |
| D687,832 S | 8/2013 | Edwards et al. |
| D689,921 S | 9/2013 | Branck et al. |
| D691,141 S | 10/2013 | Cruz |
| D691,604 S | 10/2013 | Seong et al. |
| D691,998 S | 10/2013 | Seo et al. |
| D692,885 S | 11/2013 | Cruz |
| D693,607 S | 11/2013 | Johnson et al. |
| D698,384 S | 1/2014 | Cruz |
| D703,631 S | 4/2014 | Hallar et al. |
| D703,670 S | 4/2014 | Rotsaert |
| D706,266 S | 6/2014 | Rotsaert |
| D706,863 S | 6/2014 | Branck et al. |
| D706,864 S | 6/2014 | Branck et al. |
| D707,288 S | 6/2014 | Branck et al. |
| D707,676 S | 6/2014 | Azuma |
| D707,677 S | 6/2014 | Azuma |
| D707,685 S | 6/2014 | Johnson et al. |
| D709,069 S | 7/2014 | Cruz et al. |
| D710,358 S | 8/2014 | Park et al. |
| D711,460 S | 8/2014 | Schwarzkopf et al. |
| D713,447 S | 9/2014 | Balar et al. |
| D716,300 S | 10/2014 | Cruz et al. |
| D716,301 S | 10/2014 | Almond |
| D716,370 S | 10/2014 | Park et al. |
| D716,372 S | 10/2014 | Lee et al. |
| D716,796 S | 11/2014 | Clegg et al. |
| D719,142 S | 12/2014 | Lee et al. |
| D720,000 S | 12/2014 | Lyons et al. |
| D722,985 S | 2/2015 | Won et al. |
| D723,031 S | 2/2015 | Rawal |
| D724,040 S | 3/2015 | Chan |
| D725,057 S | 3/2015 | Seo et al. |
| D725,109 S | 3/2015 | Azuma |
| D725,180 S | 3/2015 | Azuma |
| D725,181 S | 3/2015 | Azuma |
| D725,182 S | 3/2015 | Haller et al. |
| D725,699 S | 3/2015 | Eun |
| D727,898 S | 4/2015 | Yum et al. |
| D727,902 S | 4/2015 | Saulnier, III |
| D728,675 S | 5/2015 | Daniel |
| D728,676 S | 5/2015 | Reines et al. |
| D729,244 S | 5/2015 | Toh et al. |
| D729,801 S | 5/2015 | Daniel |

(56) References Cited

U.S. PATENT DOCUMENTS

| | | | |
|---|---|---|---|
| RE45,547 E | 6/2015 | Andre et al. |
| D731,501 S | 6/2015 | Tseng et al. |
| D732,029 S | 6/2015 | Huh et al. |
| D732,037 S | 6/2015 | Wylie |
| 9,070,062 B2 | 6/2015 | Rezayee |
| 9,092,766 B1 | 7/2015 | Bedier et al. |
| D735,717 S | 8/2015 | Lam et al. |
| D735,802 S | 8/2015 | Lyons et al. |
| D735,805 S | 8/2015 | Haller |
| D740,285 S | 10/2015 | Templeton |
| D740,286 S | 10/2015 | Templeton |
| D740,819 S | 10/2015 | Weber et al. |
| D740,820 S | 10/2015 | Templeton et al. |
| D743,394 S | 11/2015 | Chang et al. |
| RE45,816 E | 12/2015 | Andre et al. |
| D744,479 S | 12/2015 | Haller et al. |
| D746,902 S | 1/2016 | Lyons et al. |
| D747,763 S | 1/2016 | Haller |
| D748,630 S | 2/2016 | Helwig et al. |
| D752,587 S | 3/2016 | Gong |
| 9,323,961 B2 | 4/2016 | Azuma |
| D755,783 S | 5/2016 | Shi et al. |
| D755,796 S | 5/2016 | Gibson |
| D756,367 S | 5/2016 | Kim |
| D757,821 S | 5/2016 | Leopardi et al. |
| D760,724 S | 7/2016 | Kang et al. |
| D761,260 S | 7/2016 | Luo |
| D761,350 S | 7/2016 | Beatty et al. |
| D761,899 S | 7/2016 | Beatty et al. |
| D762,258 S | 7/2016 | Jenkins |
| D762,766 S | 8/2016 | Bedier et al. |
| D763,255 S | 8/2016 | Lee |
| D763,346 S | 8/2016 | Jenkins |
| D764,419 S | 8/2016 | Kashimoto |
| D764,458 S | 8/2016 | Jobetto et al. |
| D765,623 S | 9/2016 | Yang et al. |
| D766,901 S | 9/2016 | Nguyen |
| D767,508 S | 9/2016 | Dimberg et al. |
| D770,449 S | 11/2016 | Bae et al. |
| D770,450 S | 11/2016 | Bae et al. |
| D771,628 S | 11/2016 | Bae et al. |
| D772,335 S | 11/2016 | Mantrawadi et al. |
| D772,864 S | 11/2016 | Musch et al. |
| D773,455 S | 12/2016 | Lee et al. |
| D774,510 S | 12/2016 | Rotsaert |
| D777,683 S | 1/2017 | Kashimoto |
| D778,982 S | 2/2017 | Beatty et al. |
| D779,459 S | 2/2017 | Schlossberg et al. |
| D780,187 S | 2/2017 | Lee |
| 9,569,648 B2 | 2/2017 | Rezayee |
| D781,372 S | 3/2017 | Floersch et al. |
| D784,331 S | 4/2017 | Balch et al. |
| D787,510 S | 5/2017 | Kitade |
| 9,659,466 B1 | 5/2017 | Chen et al. |
| D788,780 S | 6/2017 | Chen |
| D790,536 S | 6/2017 | Kitade |
| 9,678,846 B2 | 6/2017 | Lam et al. |
| D791,860 S | 7/2017 | Greaves et al. |
| D791,861 S | 7/2017 | Battle |
| D792,415 S | 7/2017 | Tsai |
| D794,021 S | 8/2017 | Rhodes et al. |
| D794,580 S | 8/2017 | Dimberg et al. |
| D795,869 S | 8/2017 | Templeton |
| D797,106 S | 9/2017 | Paolizzi et al. |
| D797,739 S | 9/2017 | Templeton |
| D797,740 S | 9/2017 | Nguyen |
| D798,378 S | 9/2017 | Kim |
| D798,871 S | 10/2017 | Avganim |
| D799,494 S | 10/2017 | Lee |
| D804,483 S | 12/2017 | Minoli |
| 9,846,796 B2 | 12/2017 | Rezayee |
| D806,450 S | 1/2018 | Seong |
| D810,816 S | 2/2018 | Chen |
| D811,472 S | 2/2018 | Chen |
| D812,130 S | 3/2018 | Chen |
| D812,564 S | 3/2018 | Feng |
| D815,077 S | 4/2018 | Sibley et al. |
| D831,107 S | 10/2018 | Chen |
| 2006/0186995 A1 | 8/2006 | Wu et al. |
| 2006/0198097 A1 | 9/2006 | Kuwajima et al. |
| 2007/0013486 A1 | 1/2007 | Yeoh et al. |
| 2007/0060221 A1 | 3/2007 | Burgan et al. |
| 2007/0205871 A1 | 9/2007 | Posamentier |
| 2008/0089453 A1 | 4/2008 | Komatsu |
| 2008/0291615 A1 | 11/2008 | Sakata et al. |
| 2009/0109003 A1* | 4/2009 | Tucker ..................... H03H 7/40 |
| | | | 340/10.1 |
| 2009/0316343 A1 | 12/2009 | Tang |
| 2009/0325511 A1 | 12/2009 | Kim |
| 2010/0043503 A1 | 2/2010 | Yao |
| 2010/0093279 A1 | 4/2010 | Linsky et al. |
| 2011/0248825 A1 | 10/2011 | Hamel et al. |
| 2012/0145787 A1 | 6/2012 | Lin |
| 2012/0300870 A1 | 11/2012 | Dickey |
| 2013/0155595 A1 | 6/2013 | Herring et al. |
| 2013/0320177 A1 | 12/2013 | Chen et al. |
| 2014/0144988 A1 | 5/2014 | Chiang |
| 2014/0227986 A1* | 8/2014 | Kanno ................. H04B 5/0031 |
| | | | 455/115.1 |
| 2014/0236744 A1 | 8/2014 | Drew et al. |
| 2014/0279116 A1 | 9/2014 | Vasquez et al. |
| 2014/0347000 A1 | 11/2014 | Hamann et al. |
| 2015/0001291 A1 | 1/2015 | Govindarajan et al. |
| 2015/0149311 A1 | 5/2015 | Ward et al. |
| 2015/0193754 A1 | 7/2015 | Lam et al. |
| 2015/0213416 A1 | 7/2015 | Lam et al. |
| 2015/0213424 A1 | 7/2015 | Lam et al. |
| 2016/0005274 A1 | 1/2016 | Wang et al. |
| 2016/0029797 A1 | 2/2016 | King |
| 2016/0051067 A1 | 2/2016 | Law et al. |
| 2016/0070964 A1 | 3/2016 | Conrad |
| 2016/0232508 A1 | 8/2016 | Nishiie et al. |
| 2016/0335037 A1 | 11/2016 | Baranowski et al. |
| 2017/0061746 A1 | 3/2017 | Tanaka |
| 2017/0140615 A1 | 5/2017 | Larnac et al. |
| 2017/0278361 A1 | 9/2017 | Fujimoto |

FOREIGN PATENT DOCUMENTS

| | | | |
|---|---|---|---|
| EP | 0 992 931 A1 | 4/2000 |
| EP | 2 636 195 B1 | 7/2015 |
| JP | D1596059 S | 1/2018 |
| JP | D1596060 S | 1/2018 |
| JP | D1596061 S | 1/2018 |
| WO | 2012/058749 A1 | 5/2012 |
| WO | 2013/006954 A1 | 1/2013 |
| WO | 2018/067559 A1 | 4/2018 |

OTHER PUBLICATIONS

Finkenzeller, K., "RFID Handbook: Fundamentals and Applications in Contactless Smart Cards and Identification," Second Edition, New York: Wiley & Sons Ltd., pp. 135 (2003), Part 1.

Finkenzeller, K., "RFID Handbook: Fundamentals and Applications in Contactless Smart Cards and Identification," Second Edition, New York: Wiley & Sons Ltd., pp. 165 (2003), Part 2.

Finkenzeller, K., "RFID Handbook: Fundamentals and Applications in Contactless Smart Cards and Identification," Second Edition, New York: Wiley & Sons Ltd., pp. 135 (2003), Part 3.

Liao, S., "Square made its own payment register," THEVERGE. com, published Oct. 30, 2017, Retrieved from the Internet URL: https://www.theverge.com/2017/10/30/16572864/square-register-new-buying-coffee-what-new-tablet, p. 1.

"Sales Terminals," (Design—©Questel). orbit.com, dated Feb. 27, 1995 through Feb. 22, 2017, Retrieved from the Internet URL: https://sobjprd.questel.fr/export/QPTUJ214/pdf2/c5db0b62-727b-4859-90a4-31e876dab4e0-144030.pdf, on Oct. 12, 2017, pp. 1-32.

Notice of Allowance dated Jan. 9, 2013, for U.S. Appl. No. 12/917,901, of Rezayee, A., et al., filed Nov. 2, 2010.

Notice of Allowance dated Apr. 3, 2013, for U.S. Appl. No. 12/917,901, of Rezayee, A., et al., filed Nov. 2, 2010.

(56) References Cited

OTHER PUBLICATIONS

Non-Final Office Action dated Sep. 4, 2014, for U.S. Appl. No. 13/544,326, of Rezayee, A., filed Jul. 9, 2012.
Notice of Allowance dated Feb. 13, 2015, for U.S. Appl. No. 13/544,326, of Rezayee, A., filed Jul. 9, 2012.
Non Final Office Action dated Sep. 17, 2015, for U.S. Appl. No. 14/701,281, of Rezayee, A., filed Apr. 30, 2015.
Final Office Action dated Feb. 17, 2016, for U.S. Appl. No. 14/701,281, of Rezayee, A., filed Apr. 30, 2015.
Non-Final Office Action dated Apr. 29, 2016, for U.S. Appl. No. 14/701,281, of Rezayee, A., filed Apr. 30, 2015.
Notice of Allowance for Canadian Patent Application No. 2,816,767, dated Aug. 5, 2016.
Examiner Requisition for Canadian Patent Application No. 2,842,057, dated Sep. 2, 2016.
Notice of Allowance dated Sep. 29, 2016, for U.S. Appl. No. 14/701,281, of Rezayee, A., filed Apr. 30, 2015.
Non-Final Office Action dated Mar. 3, 2017, for U.S. Appl. No. 15/380,946, of Rezayee, A., filed Dec. 15, 2016.
Notice of Allowance for Canadian Patent Application No. 2,842,057, dated Mar. 27, 2017.
Examination Report for European Design Applications No. 003877851-0001/003877851-0008, dated May 12, 2017.
English-language translation of Notice to Grant for Chinese Design Application No. 2017301490089, dated Aug. 3, 2017.
Notice of Allowance dated Aug. 14, 2017, for U.S. Appl. No. 15/380,946, of Rezayee, A., filed Dec. 15, 2016.
Notice of Allowance dated Oct. 31, 2017, for Design U.S. Appl. No. 29/582,639, of Chen, Y., filed Oct. 28, 2016.
Notice of Allowance dated Oct. 31, 2017, for Design U.S. Appl. No. 29/582,655, of Chen, Y., filed Oct. 28, 2016.
Notice of Allowance dated Oct. 31, 2017, for Design U.S. Appl. No. 29/582,668, of Chen, Y., filed Oct. 28, 2016.
First Examiner's Report for Canadian Design Application No. 174467, dated Nov. 1, 2017.
First Examiner's Report for Canadian Design Application No. 174468, dated Nov. 1, 2017.
First Examiner's Report for Canadian Design Application No. 174469, dated Nov. 1, 2017.
Certificate of Registration for European Design Application No. 003877851-0001 mailed Nov. 9, 2017.
Certificate of Registration for European Design Application No. 003877851-0002 mailed Nov. 9, 2017.
Certificate of Registration for European Design Application No. 003877851-0003 mailed Nov. 9, 2017.
Certificate of Registration for European Design Application No. 003877851-0004 mailed Nov. 9, 2017.
Certificate of Registration for European Design Application No. 003877851-0005 mailed Nov. 9, 2017.
Certificate of Registration for European Design Application No. 003877851-0006 mailed Nov. 9, 2017.
Certificate of Registration for European Design Application No. 003877851-0007 mailed Nov. 9, 2017.
Certificate of Registration for European Design Application No. 003877851-0008 mailed Nov. 9, 2017.
Corrected Notice of Allowance dated Dec. 1, 2017, for U.S. Design U.S. Appl. No. 29/582,655, of Chen, Y., filed Oct. 28, 2016.
English-language translation of Notification to Grant for Chinese Design Application No. 2017301490182, dated Jan. 4, 2018.
English-language translation of Certificate of Patent for Design for Chinese Design Application No. 2017301490089, mailed Feb. 2, 2018.
English-language translation of Certificate of Patent for Design for Chinese Design Application No. 2017301490182, mailed Apr. 6, 2018.
Non-Final Office Action dated May 15, 2018, for Design U.S. Appl. No. 29/637,763, of Chen, Y., filed Feb. 21, 2018.
Notice of Allowance dated Jun. 6, 2018, for Design U.S. Appl. No. 29/637,758, of Chen, Y., filed Feb. 21, 2018.
Final Office Action dated Sep. 4, 2018, for Design U.S. Appl. No. 29/637,763, of Chen, Y., filed Feb. 21, 2018.
Non-Final Office Action dated Dec. 4, 2018, for Design U.S. Appl. No. 29/637,763, of Chen, Y., filed Feb. 21, 2018.
International Search Report and Written Opinion for International Application No. PCT/CA2011/001185, dated Jan. 9, 2012.
International Search Report and Written Opinion for International Application No. PCT/CA2012/000659, dated Oct. 15, 2012.
Extended European Search Report for European Patent Application No. 11837351.3, dated Jul. 4, 2014.

\* cited by examiner

TRANSMIT PHASE DETECTION CIRCUIT

BACKGROUND

Near field communication ("NFC") devices are capable of communicating when they are placed in close proximity to each other, and may be used for transactions such as payment transactions. Each of the NFC communication devices includes an antenna and related circuitry such as a matching circuit. A first NFC communication device generates a wireless carrier signal at a suitable frequency such as 13.56 MHz and transmits that signal over its antenna. When the antenna of a second NFC communication device is placed in close proximity to the antenna of the first NFC communication device, the two devices become inductively coupled, such that energy is coupled between the two devices through a shared magnetic field.

An NFC device may be a NFC transmitter that provides a signal such as a carrier signal or a modulated version of the carrier signal based on data. The signal may be provided by circuitry and may have a phase, amplitude, waveform, and other characteristics. For example, a signal may initially be generated by circuitry such as a processor and may be a square wave at the carrier frequency, with amplitude and/or frequency provided on the output signal from the processor or by other circuitry. In some embodiments, additional circuitry may perform functions such as applying modulation to the carrier signal, tuning the antenna of the transmitter, and modifying the waveform of the signal to be transmitted. This additional circuitry may modify the phase of the signal as it is processed before being transmitted, such that an original signal provided by processing circuitry may have a different phase from the signal that is actually transmitted from the antenna.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A payment system may include a payment terminal and a payment server. The payment terminal receives payment information from a payment device such as an EMV chip card, a magnetic stripe card, or a NFC payment device. The payment terminal provides a user interface for a merchant and communicates with the payment device and the payment server to process payment transactions. The payment server processes transactions based on the payment information as well as other information (e.g., payment amount, merchant, location, etc.) received from the payment terminal, and communicates a payment result (e.g., approval or denial) back to the payment terminal.

The payment terminal may have a variety of components for wirelessly communicating payment information with a payment device, such as a near field communications (NFC) system for radio frequency (RF) communications and a card slot with physical and electrical connectivity. The payment terminal may have a transponder antenna for transmitting a RF signal to allow the payment terminal to communicate data wirelessly with a payment device based on a wireless carrier signal transmitted by the payment terminal and inductively coupled with the payment device. In order to transmit data from the payment terminal to the payment reader, the payment terminal may modulate the wireless carrier signal and transmit the modulated wireless signal via the transponder antenna.

The payment terminal may measure a phase difference of an NFC transmission circuit and tune a signal transmitted from the antenna. A transmission source may provide a transmission source signal. Before transmission from the antenna, a tuning circuit may tune the transmission source signal using an adjustable capacitor and provide a tuned transmission signal to the antenna. A sense circuit coupled to the antenna may measure the transmitted signal, and provide the measurement to a phase detection circuit for comparison with the transmission source signal.

When it receives the measured transmitted signal from the sense circuit, the phase detection circuit compares it with the transmission source signal based on a duty cycle of a phase difference signal. A processing circuit and divider circuit may reduce signal noise in the phase difference signal and provide it to an analog filtering circuit for processing (e.g., using a low-pass filter and a notch filter with a stopband at the NFC carrier frequency). An analog phase signal from the analog filtering circuit corresponds to a phase difference between the measured transmitted signal and transmission source signal. A comparison circuit compares the analog phase signal to a reference signal. By providing the analog phase signal and reference signal to a comparison circuit, a decision circuit may evaluate a comparison signal from the comparison circuit and adjust the operation of the transmission circuit based on the comparison.

Figure 1:
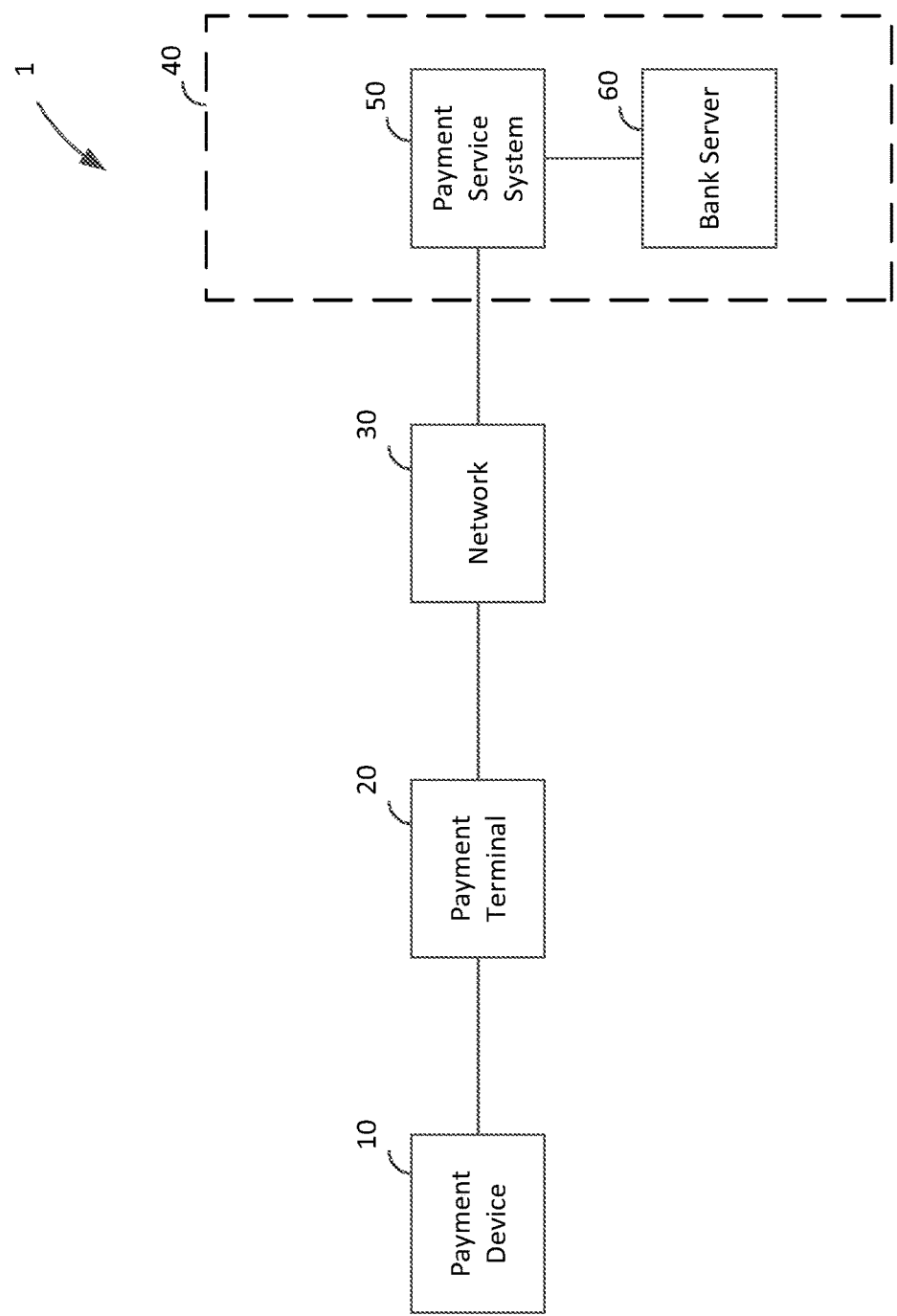
FIG. 1 shows an illustrative block diagram of a payment system in accordance with some embodiments of the present disclosure.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
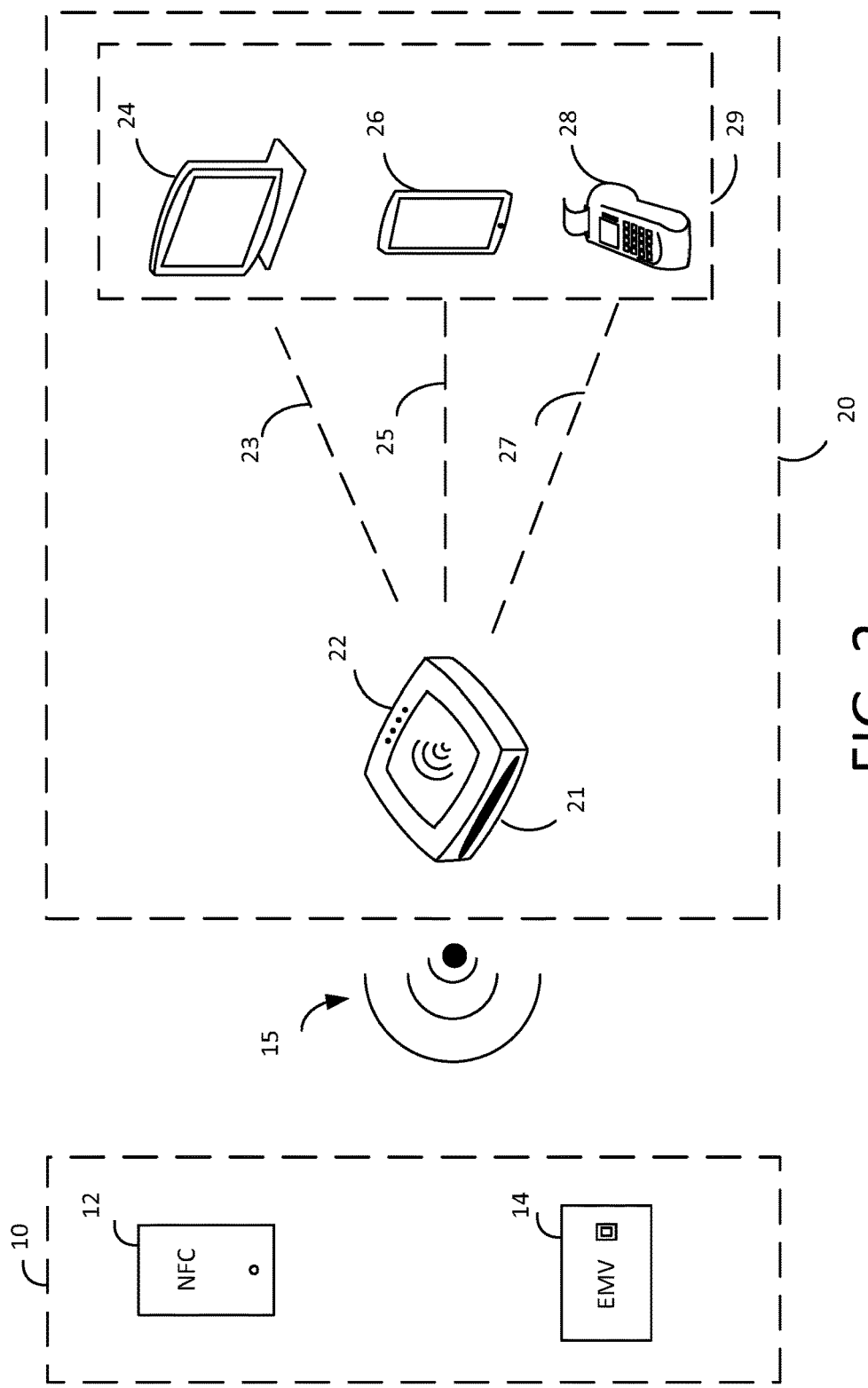
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g., by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
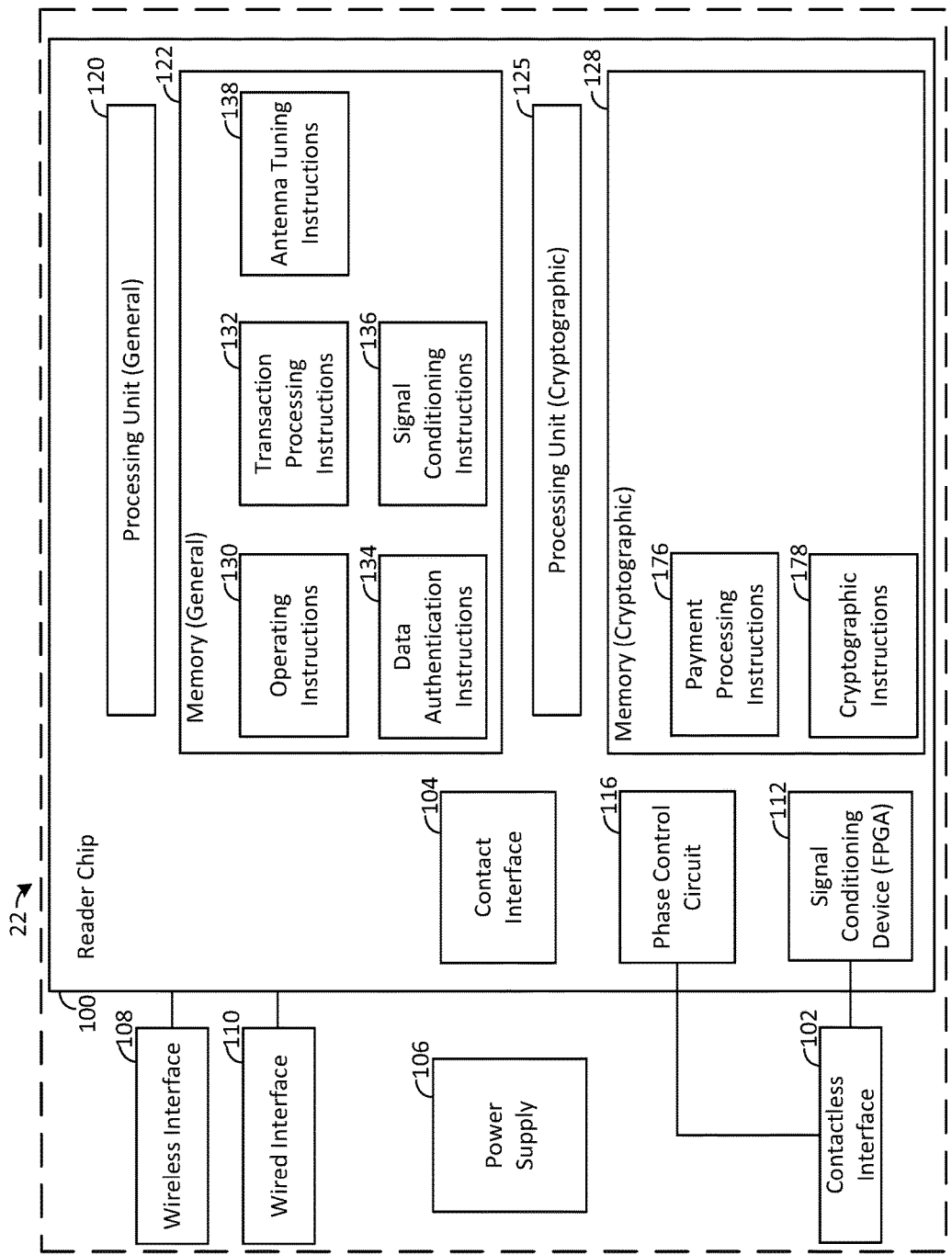
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a reader chip 100, a plurality of payment interfaces (e.g., a contactless interface 102 and a contact interface 104), a power supply 106, a wireless communication interface 108, a wired communication interface 110, a signal conditioning device 112 and anti-tamper devices 118. In an embodiment, the reader chip 100 of payment reader 22 may include a general processing unit 120, general memory 122, a cryptographic processing unit 125 and cryptographic memory 128, an anti-tamper circuit 116, a contact interface 104, and NFC signal conditioning circuitry 112. Although in one embodiment the processing units memories, contact interface 104, signal conditioning device 112, and anti-tamper circuit 116 will be described as packaged in a reader chip 100, and configured in a particular manner, it will be understood that general processing unit 120, general memory 122, a cryptographic processing unit 125 cryptographic memory 128, contact interface 104, signal conditioning device 112, and anti-tamper circuit 116 may be located and configured in any suitable manner to perform the functionality of the payment reader 22 as is described herein. It will also be understood that the functionality of reader chip 100 may be embodied in a single chip or a plurality of chips, each including any suitable combination of processing units, memory, and other components to collectively perform the functionality of reader chip 100 described herein.

In some embodiments, reader chip 100 may be a suitable chip having a processing unit. Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions provided from any suitable number of memories and memory types. In some embodiments, processing unit 120 may have multiple independent processing units, for example a multi-core processor or other similar component. In an embodiment, processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but do not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., $I^2C$, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (e.g., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 also may also include a signal conditioning FPGA 112 and analog front end circuitry for interfacing with contactless interface 102 (e.g., electromagnetic compatibility (EMC) circuitry, matching circuits, modulation circuitry, and measurement circuitry). In addition, reader chip 100 may comprise one or more pins for providing a transmission signal (e.g., positive or negative transmit pins) having a desired polarity. In some embodiments, the one or more pins may be coupled to a component of the contactless interface 102, such as a tuning circuit, a power control circuit, or other component.

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

In an embodiment, contactless interface 102 may include additional front end circuitry coupled to an antenna of contact interface 102 for improving NFC performance of payment reader 22. For example, contactless interface 102 may comprise various components for generating a field for facilitating NFC communication, such as with payment device 10, such as matching circuitry, electromagnetic interference (EMI) filters, or otherwise. As described in greater detail below, in some embodiments, contactless interface 102 may comprise a tuning circuit for tuning transmission signals. The tuning circuit may facilitate adjustment of a phase of a transmission signal provided to contactless interface 102 for transmission, such as by enabling variation of a voltage of a capacitor of the tuning circuit. Based on the variation, a phase of the transmission signal may be shifted as desired before the transmission signal is provided to the antenna of contactless interface 102 for transmission. In addition, contactless interface 102 may comprise phase adjustment circuitry for modifying and facilitating voltage applied to components of contactless interface 102, such as voltage provided to the tuning circuit and antenna. In some embodiments, the circuitry may comprise a power control circuit or similar circuitry for facilitating application of voltage across the tuning circuit and antenna of contractless interface 102.

In some embodiments, contactless interface 102 may further comprise sense circuitry for measuring characteristics of an NFC transmitted signal from the antenna of the contactless interface 102. As described in further detail below, in an embodiment, the sense circuitry may include components and hardware for measuring a voltage of the transmitted signal at the antenna of contactless interface 102. In some embodiments, the sense circuit may provide the voltage measurement of the transmitted signal to reader chip 100, and reader chip 100 may determine a phase of the transmitted signal based on the measurement.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit (not depicted) and memory (not depicted).

Wired communication interface 110 may include any suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

In some embodiments, reader chip 100 may include a signal conditioning device 112 coupled to the contactless interface 102 to process signals provided to and received from the contactless interface 102. Although signal conditioning device 112 may include any suitable hardware, software, or any combination thereof, in an exemplary embodiment signal conditioning device may comprise an FPGA. Signal conditioning device 112 may condition sent and received signals to and from contactless interface 102, such as when a payment device 10 using NFC communication communicates with payment reader 22. In an embodiment, signal conditioning device 112 may operate based on instructions stored at reader chip 100 (e.g., signal conditioning instructions 136) for use in interacting with the contactless interface 102.

In some embodiments, reader chip 100 may include a phase control circuit 116 for measuring and adjusting a phase difference of signals provided to and transmitted by NFC communication components of payment reader 22, such as may be present in contactless interface 102. Although phase control circuit 116 may be implemented in hardware or software and may include components or circuitry for performing signal phase measurement and adjustment functions described herein, in an embodiment, phase control circuit 116 may include a binary phase detection circuit, analog filtering circuit, phase detection circuitry, comparison circuit and decision circuit, as described hereafter in greater detail with regard to FIGS. 5-7.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, data authentication instructions 134, signal conditioning instructions 136, and antenna tuning instructions 138.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing memories stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Signal conditioning instructions 136 may include instructions for conditioning signals received from a payment device 10 via the contactless interface 102 (e.g., from a NFC payment device 10). Although in some embodiments, signal conditioning instructions 136 may include instructions for manipulating signals received via contactless interface 102, signal conditioning instructions 136 may include instructions for conditioning signals, including signals that are initially processed by signal conditioning hardware, such as signal conditioning device 112.

Antenna tuning instructions 138 may include instructions for performing tuning of an antenna of payment reader 22, such as NFC antenna of contactless interface 102 for communicating via NFC transmissions. One or more signals (e.g., a transmission source signal) may be generated at reader chip 100 and provided to contactless interface 102 for transmission (e.g., as a transmitted signal). In some embodiments, payment reader 22 may communicate with other devices (e.g., payment device 10) via NFC communication protocol using inductive coupling. As noted herein, a payment reader 22 may generate a field for providing a carrier signal (13.56 MHz) and sending and receiving data with another device via modulation of the carrier signal. However, in some instances the phase of the transmission source signal generated by a signal generator may differ from the phase of the transmitted signal (e.g., as the signal is modulated, filtered, and processed by tuning circuitry). In some embodiments, antenna tuning instructions 138 may be implemented in hardware, but in an embodiment, antenna tuning instructions 138 may be implemented in software and stored in memory 122.

In some embodiments, processing unit 120 may execute antenna tuning instructions 138 to set a desired phase shift of a transmitted signal from payment reader 22. A phase shift of the transmitted signal may be implemented by adjusting the operation of tuning components such as by modifying a voltage provided to a variable capacitance capacitor of the tuning circuit. A phase reference signal voltage may be selected and set (e.g., as a threshold) using a reference signal modification circuit (described in further detail below with reference to FIG. 5), and the phase of the transmitted signal may be shifted using a phase adjustment circuit (described in further detail below with reference to FIG. 5) to alter voltage provided to the tuning circuit to match the desired phase difference as indicated by the phase reference signal. The transmitted signal may be processed along with the transmission source signal and filtered using processing and filtering circuitry, as described below, to produce an analog phase signal representative of the phase difference between the two signals. The phase reference signal voltage and voltage of the analog phase signal may be compared (e.g., by the phase detection circuit) and an output indicative of the comparison may be output (e.g., a binary output). In this regard, antenna tuning instructions 138 may include instructions for adjusting the phase of the transmitted signal based on the comparison.

As an example, antenna tuning instructions 138 may include instructions for determining whether a voltage provided by the phase adjustment circuit is above or below a voltage set by selecting a node of the reference signal modification circuit that corresponds to a desired phase shift of the transmitted signal. The determination may be based on a comparison of a voltage of the analog phase signal with a voltage of a phase reference signal from the node of the reference signal modification circuit (e.g., whether the analog phase signal voltage is above or below the phase reference signal voltage). In some embodiments, antenna tuning instructions 138 may include instructions for determining that the analog phase signal voltage is below the voltage of the phase reference signal based on the output of the phase detection circuit (e.g., a binary output). In some embodiments, an output of binary "zero" may indicate that a voltage of the analog phase signal is below the desired voltage threshold selected using the reference signal modification circuit, as indicated by the voltage of the phase reference signal, and indicating that the actual phase difference is less than the phase difference associated with the reference signal. An output of binary "one" may indicate that the analog phase signal voltage is above the voltage of the phase reference signal. If the transmitted signal voltage is below the desired voltage of the phase reference signal, processing unit 120 may determine that the phase shift of the transmitted signal is below the desired phase shift, and may increment a voltage of a phase adjustment signal. If the transmitted signal voltage is above the desired voltage of the phase reference signal, processing unit 120 may decrement the voltage of the phase adjustment signal.

In an embodiment, the voltage may be incremented or decremented until the voltage of the transmitted signal corresponds to the desired voltage indicated by the phase reference signal (e.g., by identifying a high-resolution step change in which the output of the comparator changes). In some embodiments, processing unit 120 may increment or decrement a voltage of the reference signal modification circuit or phase adjustment circuit by selecting a corresponding node, as described further below. In this regard, processing unit 120 may vary the voltage provided from the phase adjustment circuit to the tuning circuit so that it converges on the desired transmit signal voltage. Note that, in some embodiments, antenna tuning instructions 130 may comprise instructions for converging on the desired voltage using one or more search techniques (e.g., binary or linear searching, interpolation or otherwise). In some embodiments, processing unit 120 may perform any of these operations by executing instructions stored as antenna tuning instructions 138, but the instructions may be stored in any one or more locations in other embodiments.

Antenna tuning instructions 138 also may include instructions for identifying a phase shift present in a transmitted signal. Processing unit 120 may vary a voltage of the phase reference signal by selecting nodes of the reference signal modification circuit. Phase detection circuit may output a binary output indicating whether the voltage of the phase reference signal falls below or exceeds the voltage of the analog phase signal. Based on antenna tuning instructions 138, processing unit 120 may continue to vary the voltage of the phase reference signal until it converges on the voltage value of the analog phase signal, as indicated by the output of the phase detection circuit. In some embodiments, antenna tuning instructions 138 may comprise instructions implementing any search technique (e.g., binary or linear searching, interpolation or otherwise) for determining the voltage of the analog phase signal by varying the voltage of the phase reference signal. Once the phase reference signal value that corresponds to the analog phase signal is determined Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Figure 4:
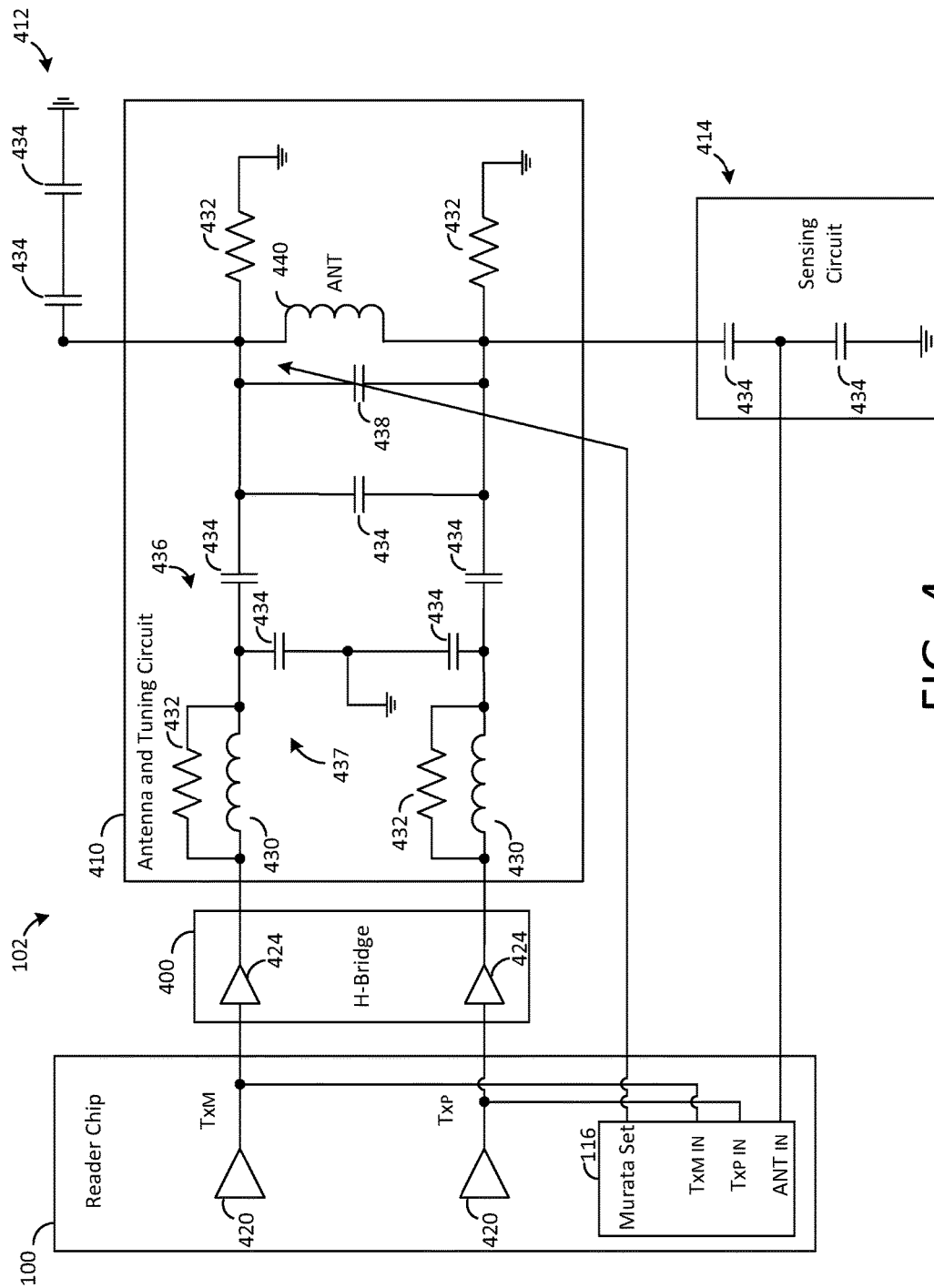
FIG. 4 depicts an exemplary reader chip and contactless interface in accordance with some embodiments of the present disclosure.

FIG. 4 depicts an exemplary reader chip and contactless interface in accordance with some embodiments of the present disclosure. In the embodiment of FIG. 4, the components of reader chip 100 and contactless interface 102 may be depicted as appearing in a particular configuration and arrangement, and comprising particular components, but it will be understood that other combinations and arrangements of components may be possible for achieving the functionality described herein in other embodiments. In some embodiments, contactless interface 102 may include a power control circuit 400, tuning circuit 410, replica circuit 412 and sense circuit 414.

In the embodiment of FIG. 4, reader chip 100 comprises phase control circuit 116, a plurality of transmit pins (e.g. TxM and TxP) and a plurality of buffers 420. In some embodiments, phase control circuit 116 may comprise various hardware and components, described in greater detail below, for performing phase measurement and adjustment. In an embodiment, phase control circuit 116 may comprise a plurality of pins for providing and receiving signals from various components of payment reader 22 and resources of reader chip 100. Each signal may have a power, amplitude, frequency, phase, duty cycle and waveform. Phase control circuit 116 may include Murata Set, TxM input, TxP input and ANT input pins, though phase detection circuit may comprise any number of pins in other embodiments. Murata Set pin may be coupled to tuning circuit 410 and may output a signal from phase control circuit 116 for controlling a voltage applied to a variable capacitance capacitor of tuning circuit 410. TxM input pin and TxP input pin may be coupled to one or more transmission lines for receiving a transmission source signal generated at reader chip 100 for transmission via contactless interface 102. ANT input pin may be coupled to sense circuit 414, and may receive a signal from sense circuit indicative of a measurement of a transmitted signal from the antenna of the contactless interface 102. Each of the foregoing pins may receive or provide other signals from or to other components or resources in other embodiments.

In some embodiments, contactless interface 102 may include a power control circuit 400 for altering a transmit signal provided from reader chip 100 for transmission via contactless interface 102. In some embodiments, power control circuit 400 is implemented in hardware and includes circuitry (e.g., H-Bridge circuitry 424) for boosting a signal provided by reader chip 100. In other embodiments, power control circuit 400 may be implemented in hardware or software and may include any components for altering a signal provided from reader chip 100 to contactless interface 102.

Tuning circuit 410 may be coupled to reader chip 100, power control circuit 400, and antenna 440 and may include components for providing a tuned transmission signal for transmission via the antenna 440. In some embodiments, tuning circuit 410 may be implemented in hardware and may include one or more inductors 430, resistors 432, capacitors 434 and variable capacitance capacitors 438. The inductors 430, resistors 432 and capacitors 434 of tuning circuit may be arranged in one or more matching circuits, electromagnetic interference (EMI) filters, or otherwise. In the embodiment of FIG. 4, a plurality of inductors 430, resistors 432, and capacitors 434 are arranged to perform a combination of functions, including those of an EMI filter circuit 436 (e.g., reducing electrical noise within the matching circuit and near antenna 440) and matching network 437 (e.g., matching a source impendance to load impedance). The plurality of inductors 430, resistors 432, and capacitors 434 may be arranged in other configurations and other numbers of each are in other embodiments. In some embodiments, each of inductors 430, resistors 432, and capacitors 434 may comprise conventional hardware, and may have fixed or variable respective inductance, resistance, or capacitance values. In the embodiment of FIG. 4, each of inductors 430, resistors 432 and capacitors 434 has a fixed inductance, resistance, and capacitance values.

In an embodiment, the transmit signal may be provided to the antenna 440 via tuning circuit 410. In the embodiment of FIG. 4, variable capacitor 438 may be coupled to phase control circuit 116 (e.g., via Murata Set pin or otherwise), and may modify the phase of the output signal by modifying the capacitance for the variable capacitor 438. The phase adjustment signal may have a value (e.g., voltage) to adjust a capacitance of variable capacitor 438. Variations in the capacitance of capacitor 438 may enable tuning circuit 410 to shift of a phase of a transmission source signal received from reader chip 100 to generate a tuned transmitted signal. The tuned transmission signal may be provided for transmission to the antenna 440 coupled to the tuning circuit 410.

As an example, in some embodiments, payment reader 22 may communicate via NFC communication (e.g., modulation of an inductively coupled carrier signal) with a payment device 10. A transmission source signal may comprise modulations of the carrier signal for transmission to the payment device 10 and may comprise a phase, frequency, power, or otherwise. Reader chip 100 may generate and provide the transmission source signal to tuning circuit 410 (via power control circuit 400). Tuning circuit 410 may tune the transmission source signal based on components of the tuning circuit, such as by adjusting a phase of the transmission source signal based on the voltage of the variable capacitance capacitor 438. Tuning circuit 410 may provide the tuned transmission signal from the transmission source signal to antenna 440, which may transmit the tuned transmission signal. In other embodiments, tuning circuit 410 may tune the transmission source signal using other components, hardware, software, or otherwise, and may provide the tuned transmission signal to other components or perform other tuning of the transmission source signal prior to or subsequent to transmission from antenna 440.

Replica circuit 412 may comprise hardware for compensating electrical effects of signals provided to tuning circuit 410 and antenna 440 (e.g., transmission source signal and tuned transmission signal). In some embodiments, replica 412 includes one or more capacitors arranged in series and coupled to ground, although replica circuit 412 may comprise any components in any arrangement in other embodiments.

Sense circuit 414 may be implemented in hardware and coupled to antenna 440 and phase control circuit 116 (e.g., via ANT input pin). In some embodiments, sense circuit 414 may measure characteristics of a signal transmitted from antenna 440, such as the tuned transmission signal from the tuning circuit 410 (e.g., a voltage or phase of the tuned transmission signal when transmitted by antenna 440). In this regard, a measurement of characteristics of signals transmitted by antenna 440 may be provided to reader chip 100 for processing (e.g., to phase control circuit 116). In some embodiments, sense circuit 414 may include one or more capacitors 434 for enabling measurement of the transmitted signal from the antenna 440, but in other embodiments, sense circuit 414 may include other components or hardware. Note that the transmitted signal may have a transmitted signal phase, and that sense circuit 414 may include any necessary components for accurately capturing the phase of the transmitted signal and providing a representative signal to reader chip 100 (e.g., to ANT input pin of phase control circuit 116).

Figure 5:
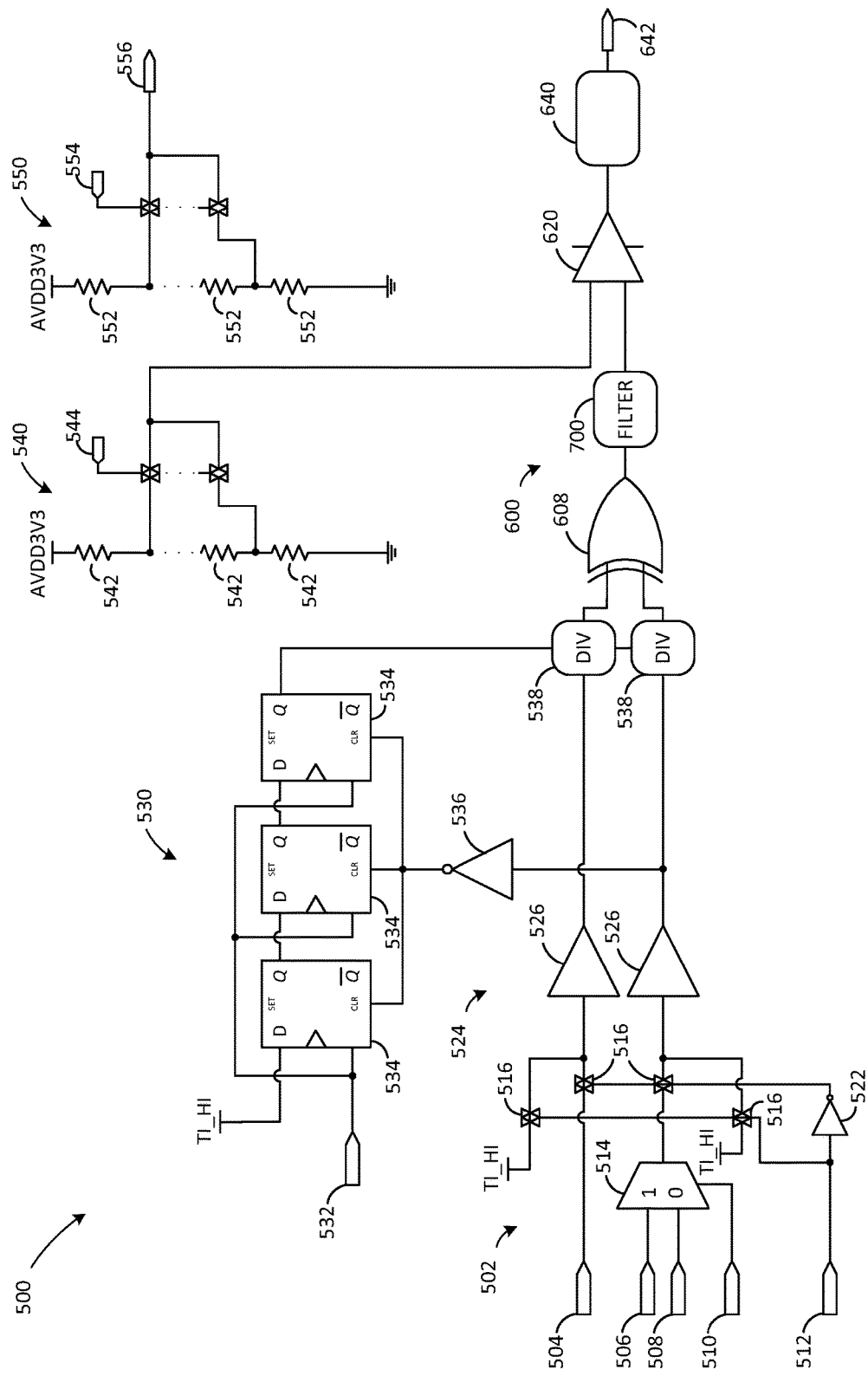
FIG. 5 depicts an exemplary transmit phase control circuit in accordance with some embodiments of the present disclosure.

FIG. 5 depicts an exemplary transmit phase control circuit 500 in accordance with some embodiments of the present disclosure. In some embodiments, transmit phase control circuit 500 may be housed on reader chip 100, may be implemented in hardware or software, and may include components for performing of functionality phase control circuit 116 described herein. Although particular components are depicted and configured in a particular arrangement in FIG. 5 it will be understood that other combinations and arrangements of components, hardware, software, or otherwise may be possible for achieving the functionality of transmit phase detection circuit 500 described herein.

In some embodiments, transmit phase control circuit 500 may include a signal selection circuit 502 for receiving signals from pins of phase control circuit 116 (e.g., Murata Set, TxM input, TxP input and ANT input pins). In some embodiments, signal selection circuit 502 may include a plurality of inputs for receiving signals provided to phase control circuit 116. The inputs may include ANT input 504, TxP input 506, TxM input 508, Tx Select input 510, and Mute input 512. ANT input 504 may receive a signal provided from sense circuitry 414 to ANT input pin of phase control circuit 116, such as the measured transmitted signal from sense circuitry 414. Similarly, TxP input 506 and TxM input 508 may receive a signal provided from reader chip 100 to the TxP and TxM input pins, such as the transmission source signal. Tx Select input 510 may receive a selection signal provided to selection circuit 514, such as from processing unit 120 of reader chip 100. Note that, in the embodiment of FIG. 5, selection circuit 514 is implemented in hardware and depicted as a conventional two-input multiplexer, but any hardware or software may be implemented for selecting and providing a source transmission signal from TxP and TxM input pins in other embodiments. In addition, Mute input 512 may provide a mute signal to one or more transmission lines coupled to any of ANT input 504, TxP input 506, TxM input 508, or Tx Select input 510 for opening a circuit such that the signal is not provided to other circuitry. In some embodiments, the mute signal from Mute input 512 may be provided to the one or more transmission lines based on toggling of one or more bypasses 516 based on an enabling input (e.g., TI_HI), such as may be received from processing unit 120 based on instructions implemented in hardware or software.

In some embodiments, the phase control circuit 500 may include processing circuitry 524 coupled to each of ANT input 504, selection circuit 514, and Mute input 512, such that the processing circuitry 524 may remove noise from the signals that are provided from these inputs. In an embodiment, processing circuitry 524 may include one or more comparators 526. As shown by FIG. 5, one comparator 526 may be coupled to receive the transmission source signal (e.g., from TxP input 506 or TxM input 508 via selection circuit 514) and another comparator 526 may be coupled to receive the measured transmitted signal (e.g., from ANT input 504). In some embodiments, each comparator 526 may comprise a Schmitt trigger for converting each of the measured transmitted signal and transmission source signal from an analog signal into a digital signal while removing or reducing noise from each signal. Each comparator 526 may comprise other hardware, software or combination thereof in other embodiments. The comparator 526 processing measured transmitted signal may output a processed measured transmitted signal and the comparator 526 processing the transmission source signal may output a processed transmission source signal.

Divider circuit 530 may be coupled to receive the processed transmission source signal, and may function to preserving phase characteristics of a signal while rejecting duty cycle distortion. In some embodiments, divider circuit 530 may comprise a reset input 532, one or more state storage circuits 534, a logic gate 536 and a plurality of signal dividers 538. A state storage circuit 534 may comprise components for storing a state of a signal (e.g., input TI_HI), such as provided from signal input, and may alter its state based on a provided clock source signal. In some embodiments, the provided clock source signal may be the processed transmission source signal, but other clock source signals may be provided in other embodiments. In addition, divider circuit 530 may have a plurality of state storage circuits 534, and may include a reset input 532 for providing a reset signal and controlling each of the plurality of state storage circuits 534.

As depicted by FIG. 5, an output signal of a final state storage circuit 534 may be provided to each of signal dividers 538. A signal divider 538 may comprise components for dividing a frequency of a signal (e.g., reducing the signal's frequency or duty cycle). In the embodiment of FIG. 5, a signal divider 538 is coupled to receive each of the processed transmission source signal and processed measured transmitted signal. When a signal divider 538 receives the output signal from the final state storage circuit 534 (e.g., a binary 1 pulse), the signal divider 538 may activate to divide an input signal (e.g., the processed transmission source signal or processed measured transmitted signal) received by the signal divider 538. In some embodiments, a signal divider 538 may output a signal in a manner that retains phase information for both input signals. In some embodiments, after signal divider 538 receives and divides the signals, the divided signals may be provided for further processing.

In some embodiments, transmit phase control circuit 500 may include a reference signal modification circuit 540 for selecting a voltage of a phase reference signal and providing a phase reference signal that is proportional to a known phase difference to binary phase detection circuit 600. In some embodiments, reference signal modification circuit 540 may include a plurality of resistors 542, which may be arranged in series or another configuration for dividing a voltage (e.g., from input AVDD3V3). In some embodiments, the plurality of resistors 542 may be arranged in a ladder configuration with a plurality of nodes representing known phase differences. The plurality of resistors 542 and nodes may be coupled to permit selection of a signal provided to the reference signal modification circuit 540 having a desired voltage value (e.g., based on the known phase difference represented by each node). Phase reference selection input 544 may be coupled to the plurality of nodes of reference signal modification circuit 540 and may select a node corresponding to a desired phase difference (e.g., based on a voltage at the node) that will be proportionally represented by phase reference signal. Phase reference selection input 544 may select a node based on a phase adjustment signal provided from decision circuitry 640, as described further below. In an embodiment, reference signal modification circuit 540 may provide a phase reference signal to comparison circuit 620 for comparison with an analog phase signal, as described below. Additional inputs, outputs and components of reference signal modification circuit 540 may be possible in other embodiments.

Transmit phase control circuit 500 may include a phase adjustment circuit 550 for selecting a voltage of a phase adjustment signal and providing the phase adjustment signal to tuning circuit 410 (e.g., to variable capacitance capacitor 438). Similar to reference signal modification circuit 540, in some embodiments, phase adjustment circuit 550 may include a plurality of resistors 552 and may be arranged in series or other configuration for dividing a voltage (e.g., AVDD3V3). In some embodiments, the plurality of resistors 552 may be arranged in a ladder configuration with a plurality of nodes and coupled to permit selection of a signal provided to the phase adjustment circuit 550 having a desired voltage value. Phase adjustment selection input 554 may be coupled to the plurality of nodes of phase adjustment circuit 550 and may select a node corresponding to a desired voltage for a phase reference signal. Phase adjustment selection input 554 may select a node based on a signal provided based on an output from decision circuitry 640, as described further below. In an embodiment, phase adjustment circuit 550 may provide a phase adjustment signal to tuning circuit 410 for adjusting voltage provided to variable capacitance capacitor 438, thereby adjusting a phase of the tuned transmission signal transmitted from antenna 440. Additional inputs, outputs and components of phase adjustment circuit 540 may be possible in other embodiments.

In some embodiments, binary phase detection circuit 600 may be coupled to divider circuit 530, reference signal modification circuit 540, and phase adjustment circuit 550 for receiving the processed measured transmitted signal and processed transmission source signal, receiving a phase reference signal, and providing a phase adjustment signal. Binary phase detection circuit 600 may comprise phase detection circuitry 608, analog filtering circuit 700, comparison circuitry 620, decision circuitry 640 and adjustment output 642. Exemplary embodiments and operations of the binary phase detection circuit 600 will be further described with reference to FIGS. 6 and 7.

Figure 6:
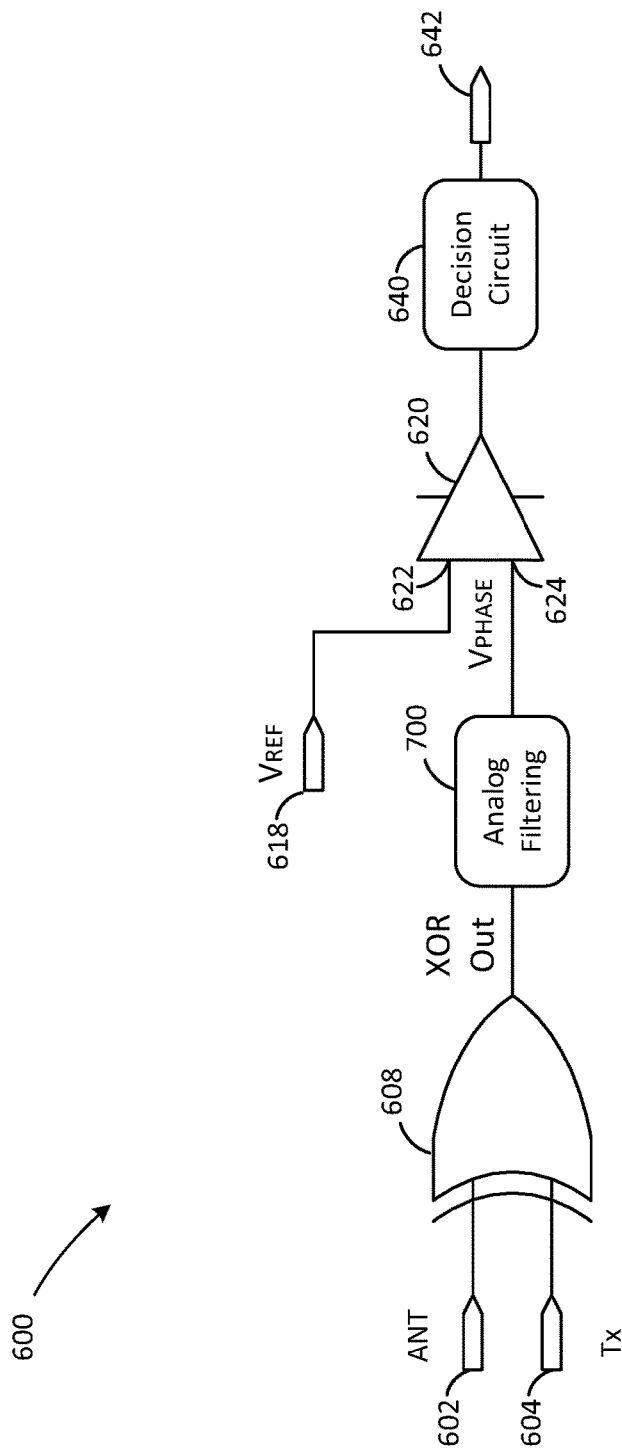
FIG. 6 depicts an exemplary binary phase detection circuit in accordance with some embodiments of the present disclosure.

FIG. 6 depicts an exemplary binary phase detection circuit 600 in accordance with some embodiments of the present disclosure. Binary phase detection circuit 600 may include various components for receiving the measured transmitted signal and transmission source signal, comparing a difference in phase between the processed measured signal and the processed transmission source signal, filtering the signals using an analog filter, comparing the analog phase signal with a phase reference signal, and generating an output to adjust operation of one or more components of the system based on the comparison. In an embodiment, binary phase detection circuit 600 may include a measured signal input 602, source signal input 604, phase detection circuitry 608, phase reference input 618, comparison circuitry 620, decision circuitry 640, and adjustment output 642. Binary phase detection circuit 600 may be implemented in hardware or software, and although FIG. 6 depicts components of binary phase detection circuit 600 implemented in a combination of hardware and software, in some embodiments, binary phase detection circuit 600 may be implemented in one or a combination of hardware, software or otherwise.

Measured signal input 602 of binary phase detection circuit 600 may be coupled to receive a first signal representative of the measured transmitted signal. In some embodiments, the first signal received by measured signal input 602 may comprise the processed measured transmitted signal received from divider circuit 538. Measured signal input 602 may be coupled to phase detection circuitry 608 to provide the first signal for comparison as described further below (e.g., to determine a phase difference between the first signal and a second signal). Measured signal input 602 may receive other signals in other embodiments.

Source signal input 604 may be coupled to receive a second signal representative of the transmission source signal. In some embodiments, the second signal received by source signal input 604 may comprise the processed transmission source signal received from divider circuit 538. Source signal input 604 may be coupled to phase detection circuitry 608 to provide the second signal for comparison with the first signal, as described below. Source signal input 604 may receive other signals in other embodiments.

Phase detection circuitry 608 may be coupled to receive the first signal from measured signal input 602 and the second signal from source signal input 604, to compare a phase of the first signal with a phase of the second signal, and to output a phase difference signal when the received signals are at different relative voltage levels. In some embodiments phase detection circuitry 608 may be implemented with one or more digital logic gates, for example, to operate as an exclusive-or (XOR) logic gate that outputs a high or logical one signal when the input values to the logic gate differ. In other embodiments, phase detection circuitry 608 may include different logic gates, and may include a combination of one or more logic gates to achieve the functionality described herein.

In an embodiment, phase detection circuitry 608 may output a phase difference signal having a duty cycle that is proportional to a phase difference between the source signal phase (e.g., indicated by the first signal) and transmitted signal phase (e.g., indicated by the second signal). In an embodiment, a phase difference signal generated by XOR logic may output a signal that is high when the phases of the input signals (e.g., measured signal input 602 and the second signal provided by the source signal input 604) are different, and low when the phases of the input signals are the same (e.g., both either high or low). A duty cycle of the phase difference signal may change based on the relative values of the first signal and second signal, such as whether the first signal and second signal are associated with different logical values. For example, when waveforms of the first signal and second signal are perfectly in phase (e.g., phase difference is zero degrees), the phase difference signal output by phase detection circuitry 608 may have a 0% duty cycle. When waveforms of the first signal and second signal are 180 degrees out of phase (e.g., phase difference is 180 degrees), the phase difference signal output by phase detection circuitry 608 may have a 100% duty cycle.

As a further example, when waveforms of the first signal and second signal are out of phase by 90 degrees (e.g., phase difference is 90 degrees), the phase difference signal output by phase detection circuitry 608 may have an average logic value (e.g., a corresponding duty cycle) of logic one divided by two (e.g., reflecting comparison of phases of the first signal and second signal). In this regard, the phase difference signal output by phase detection circuitry 608 may comprise a 50% duty cycle. Although certain examples of the functionality of phase detection circuitry 608 have been provided for the sake of efficiency, it will be understood that, in some embodiments, other components and techniques for comparing a difference in phase between the first signal provided by a measured signal inputs 602 and the second signal provided by the source signal input 604 are possible. The results of the comparison performed by phase detection circuitry 608 may be output as a phase difference signal and provided to analog filtering circuit 700 additional processing.

In an embodiment, analog filtering circuit 700 may be coupled to phase detection circuit 608 and may receive the phase difference signal. As described below, analog filtering circuit 700 may perform various filtering and processing of the phase difference signal, and may generate an analog phase signal based on the duty cycle of the phase difference signal. As described in greater detail below, in an embodiment analog filtering circuit 700 may generate an analog phase signal having a voltage level that is based on the duty cycle the phase difference signal generated by phase detection circuitry 608 (e.g., such that a higher voltage level represents a greater phase difference, and vice versa), and provide the analog phase signal to a comparison circuit 620.

In some embodiments, a comparison circuit may be utilized to perform a signal comparison between the analog phase signal and a reference signal in order to perform operations based on a measured phase difference. In an embodiment, an exemplary comparison circuit 620 may comprise components for comparing the analog phase signal from the analog filtering circuit 700 to a reference signal, such as provided by reference signal modification circuit 540. In some embodiments, comparison circuit 620 may be implemented in hardware or software or a combination thereof, and may include various components for achieving the functionality described here and assigned to comparison circuitry 620. Comparison circuit 620 may include reference signal input 622 and analog phase signal input 624. The reference signal input 622 may be coupled to receive a phase reference signal from reference signal modification circuit 540 (e.g., via reference signal input 618), and analog phase signal input 624 may be coupled to receive analog phase signal from analog filtering circuit 700.

Comparison circuit 620 may output a comparison signal based on the comparison of the analog phase signal and phase reference signal. In an exemplary embodiment, the comparison signal may perform provide a binary output value based on a comparison between the analog phase signal and the reference signal, while in other embodiments, the comparison outputs may be provided (e.g., a signal proportional to a difference between the reference signal and the analog phase signal). For example, in some embodiments, comparison circuit 620 may output a comparison signal with a low value corresponding to a binary value of zero if, based on the comparison, a value of the analog phase signal (e.g., voltage level) does not exceed a value of the same characteristic of the phase reference signal. If comparison circuit 620 determines that the value of the characteristic (e.g., voltage level) of the analog phase signal does exceed the value of the same characteristic of the phase reference signal, the comparison circuit 620 may output a comparison signal having a high value corresponding to a binary value of 1. In other embodiments, the logical output may be switched, e.g., such that an output of 1 corresponds to the voltage of the analog phase signal exceeding value of the reference signal.

In some embodiments, the output comparison circuit 620 may be coupled to provide the comparison signal to decision circuit 640 for evaluation and use in generating and providing a phase adjustment signal or modification signal, as described herein. In other embodiments, comparison circuit 620 may perform other or additional comparisons between characteristics of the analog phase single and reference signal, and may provide additional outputs to other components of the system.

Decision circuit 640 may include components for receiving a comparison signal from comparison circuitry 620 and adjusting the operation of one or more components of the of binary phase detection circuit 600 based on the comparison, including adjustment output 642. Although decision circuit 640 may be implemented in one or a combination of hardware or software, in an embodiment, decision circuit 640 may be implemented in firmware and may be stored in memory 122 on reader chip 100 as antenna tuning instructions 138 (FIG. 3). Other configurations and implementations of decision circuit 640 are possible in other embodiments.

In some embodiments, based on the phase difference signal from phase detection circuit 608, decision circuit 640 may adjust operations of various components of binary phase detection circuit 600, including phase adjustment circuit 550 and reference signal modification circuit 540. In some embodiments, decision circuit 640 may be coupled to provide signals to the various components of payment reader 22 for adjusting their operations as desired (e.g., via adjustment output 642). Examples of adjustments provided by decision circuit 640 to each of phase adjustment circuit 550 and reference signal modification circuit 540 will be discussed in turn, but it will be understood that, in some embodiments, decision circuit may perform adjustment of different operations of the phase adjustment circuit 550 and reference signal modification circuit 550, and may adjust operations of other or additional components. In addition, decision circuit 640 may perform adjustment based on other signals than the phase difference signal, comparison signal, or otherwise in some embodiments.

In an embodiment, decision circuit 640 may adjust operation of the phase adjustment circuit 550 to adjust a phase of the transmitted signal. Decision circuit 640 may provide a phase adjustment signal to circuitry such as phase adjustment circuit 550 based on the phase difference signal (e.g., as indicated by the comparison signal from comparison circuit 620). In some embodiments, the phase difference signal may comprise an estimate of the phase difference between the first signal and second signal, as noted above with regard to phase detection circuit 608. In this regard, the phase adjustment signal provided by decision circuit 640 may be based on an estimate of the phase difference (e.g., indicated by phase adjustment signal).

In some embodiments, the phase adjustment signal from decision circuitry 640 may be provided to phase adjustment circuit 550, such as via adjustment output 642, which may be coupled to provide the phase adjustment signal (e.g., to phase adjustment selection input 554). The phase adjustment signal may include information for selecting a node of the phase adjustment circuit 550 corresponding to a desired phase of the transmitted signal. Note that the phase adjustment signal may be provided based on the analog phase signal and the reference signal. For example, as described below with regard to analog filtering circuit 700, analog phase signal may be based on a duty cycle of the phase difference signal provided to comparison circuit 620 from phase detection circuit 608. The analog phase signal from analog filtering circuit 700 may have an amplitude that is proportional to a phase difference between the source signal phase and transmitted signal phase. Decision circuitry 640 may determine, based on the analog phase signal, the phase difference between the source signal phase and transmitted signal phase. Decision circuit 640 may provide a phase adjustment signal to phase adjustment circuit 550 for adjusting the phase of the transmitted signal.

Decision circuit 640 may continue adjusting the phase of the transmitted signal via the phase adjustment circuit 550 until a phase of the transmitted signal matches a desired phase or until a phase difference between the analog phase signal and phase reference signal falls below a threshold difference. In some embodiments, decision circuit 640 may determine a phase adjustment signal to provide to phase adjustment circuit 550 based on previous values of the comparison signal. Decision circuit 640 may use a search procedure, such as a linear search procedure, binary search procedure, or otherwise. In some embodiments, a linear search procedure may comprise selecting a phase adjustment signal that reduces the phase difference by a fixed amount (e.g., reduction by one half or other value) in order to reduce a phase difference between the analog phase signal and reference signal (as indicated by a value of the comparison signal). In this regard, decision circuit 640 may compare a value of the comparison signal against previous values of the comparison signal to determine a phase adjustment signal to provide to the phase adjustment circuit 550. In some embodiments, the comparison signal used by decision circuit 640 may be stored in memory of payment reader 22, such as general memory 122 of reader chip 100. In other embodiments, decision circuitry may perform other techniques for determining a phase adjustment signal, and may determine a phase adjustment signal based on other information.

In some embodiments, decision circuit 640 may adjust operation of the reference signal modification circuit 540 to modify a value of the reference signal, such as by providing a modification signal having a value that corresponds to a measured phase difference, such as may be indicated by phase difference signal from phase detection circuit 608. In some embodiments, decision circuit 640 may receive the comparison signal from comparison circuit 620 and generate and provide the modification signal to the reference signal modification circuit 540 based on the comparison signal. Decision circuit 640 also may determine a modification signal based on a current value of the reference signal and previous values of the comparison signal according to a search procedure as described above (e.g., linear, binary, or otherwise). For example, decision circuit 640 may modify the reference signal (e.g., by providing a modification signal) until the reference signal is within a threshold voltage of the analog phase signal. In some embodiments, decision circuit 640 may be coupled to provide the modification signal to reference signal modification circuit 540, such as via phase reference input 544. The modification signal may be provided to reference signal modification circuit 540 via other inputs in other embodiments.

Note that the threshold voltage may be based on a known resolution for the reference signal modification circuit 540. In some embodiments, various components of payment reader 22, such as reader chip 100, phase control circuit 116, and contactless interface 102, may comprise a processing delay (e.g., delay caused by hardware limitations when a component may be implemented in hardware). Cumulative processing delay of these components may limit a resolution with which signals may be provided from either of reference signal modification circuit 540 or phase adjustment circuit 550. For example, a propagation time for a signal, such as the reference signal or a transmission source signal generated for transmission via antenna 440 may be approximately 100 nanoseconds or some other delay value. In this regard, such delay may limit timeframes during which a may be voltage applied to a circuit, such as the reference signal modification circuit 540, or to a component, such as variable capacitance capacitor 438 via tuning circuit 410 (e.g., based on a modification signal or phase adjustment signal from decision circuit 640). In this manner, the decision circuit 640 may wait for measured or predetermined delay time before providing additional adjustments to adjust phase or modify the value of the reference signal.

Figure 7:
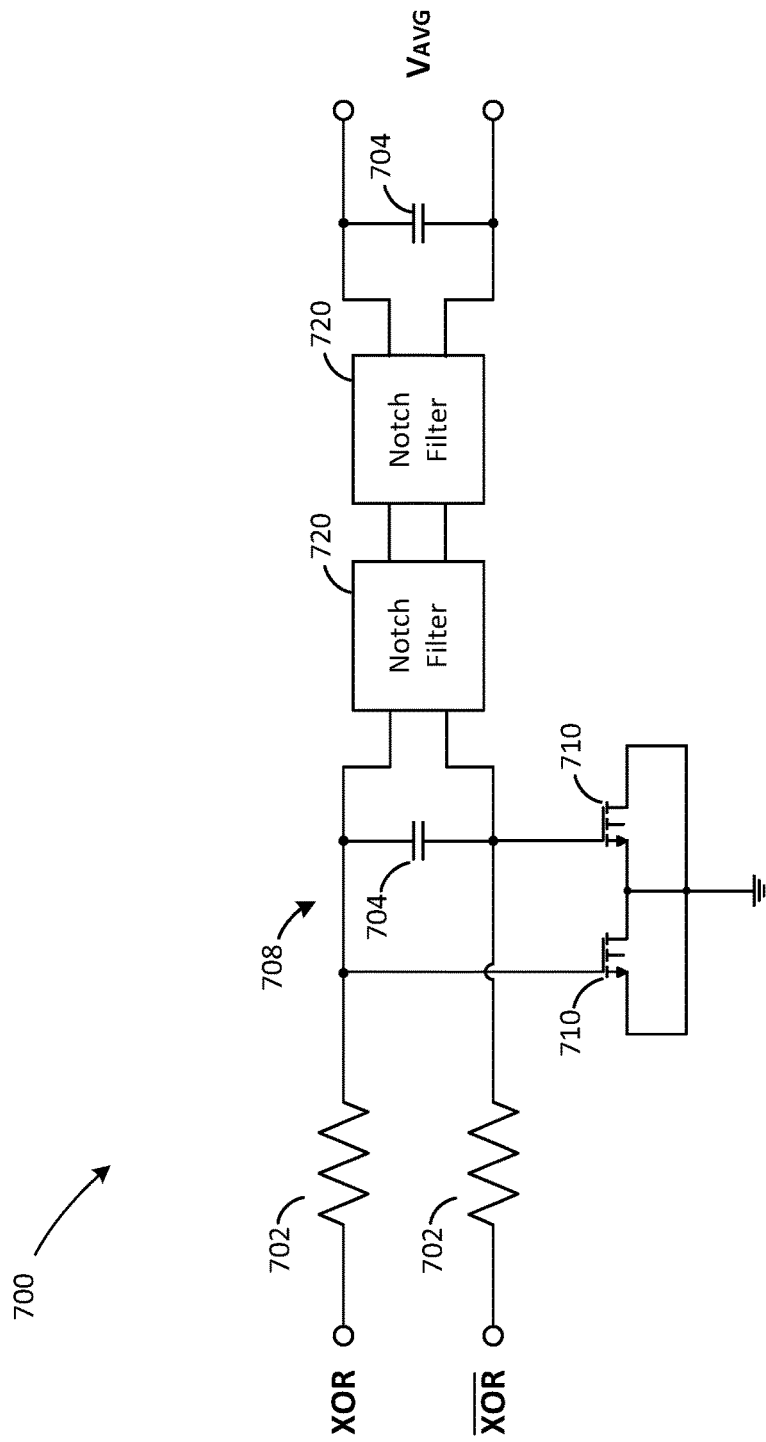
FIG. 7 depicts an exemplary analog filtering circuit in accordance with some embodiments of the present disclosure.

FIG. 7 depicts an exemplary analog filtering circuit 700 in accordance with some embodiments of the present disclosure. Analog filtering circuit 700 may be implemented in hardware and/or software, and may include components for generating an analog phase signal. In an embodiment, analog filtering circuit 700 may comprise at least one low pass filter 708 and one or more notch filters 720 for performing processing of a signal received by analog filtering circuit 700 (e.g., phase difference signal) and generating the analog phase signal. In some embodiments, analog filtering circuit 700 may be coupled to phase detection circuit 608 (FIG. 6) for receiving the phase difference signal and decision circuit 640 for providing the analog phase signal, although analog filtering circuit 700 may be coupled to other components and receive other signals in other embodiments.

One or more low-pass filters 708 may be implemented in hardware and may comprise one or more resistors 702, one or more capacitors 704 (e.g., for forming a RC filter), and one or more switches 710. In some embodiments, low-pass filter 708 receives the phase difference signal and filter frequencies from the phase difference signal based on a threshold of low-pass filter 708. That is, low-pass filter 708 may permit a signal having a frequency below the threshold of low-pass filter 708 to pass, while cutting off or attenuating a signal with a frequency above the low-pass filter 708 threshold. In this regard, low-pass filter 708 may remove noise from signals having a frequency that exceeds a desired threshold of low-pass filter 708. Thus, the one or more low-pass filters 708 may filter frequencies of the phase difference signal exceeding the threshold of low-pass filter 708 and allow the signal to pass to the one or more notch filters 720. In this regard, the analog phase signal generated by analog filtering circuit 700 may be generated based on the one or more low-pass filters 720.

One or more notch filters 720 may be implemented in hardware and may comprise components for processing the phase difference signal from low-pass filter 708. In some embodiments, low-pass filtering by the one or more low-pass filters 708 may be insufficient to eliminate noise present in a signal (e.g., ripples present in phase difference signal) that may corrupt a measurement or comparison of a phase of the signal. A notch filter 720 may have a stopband at a carrier frequency (e.g., NFC carrier frequency 13.56 MHz or other frequency) for rejecting undesired interference. Notch filter 720 eliminates a portion of a signal at a desired frequency within a stopband. In this regard, a notch filter 720 may comprise a stopband at a carrier frequency that is associated with the transmitted signal from antenna 440 (e.g., as indicated by the phase difference signal). Thus, the analog phase signal generated by analog filtering circuit 700 may be generated based on the one or more notch filters 720. Notch filter 720 may comprise additional stopbands or stopbands at other frequencies in other embodiments.

In an embodiment, the analog phase signal generated by analog filtering circuit 700 may have various characteristics and be based on one or more signals provided to the analog filtering circuit 700. In some embodiments, an amplitude of the analog phase signal may be proportional to the phase difference between the source signal and transmitted signal phase, such as may be indicated by the duty cycle of the phase difference signal from phase detection circuit 608. In some embodiments, the analog phase signal generated by passing the phase difference signal through the one or more low-pass filters 708 and one or more notch filters 720 may comprise an average value of a voltage the phase difference signal (e.g., based on its duty cycle). In this regard, the analog phase signal may be provided to permit other components of the binary phase detection circuit 600 to accurately estimate an average value of a voltage and duty cycle of the analog phase signal, such as for accurate comparison with one or more other signals. In some embodiments, the average value of the voltage and duty cycle of the analog phase signal may be compared with other values (e.g., a voltage or duty cycle of the reference signal), such as by comparison circuit 620.

Figure 8:
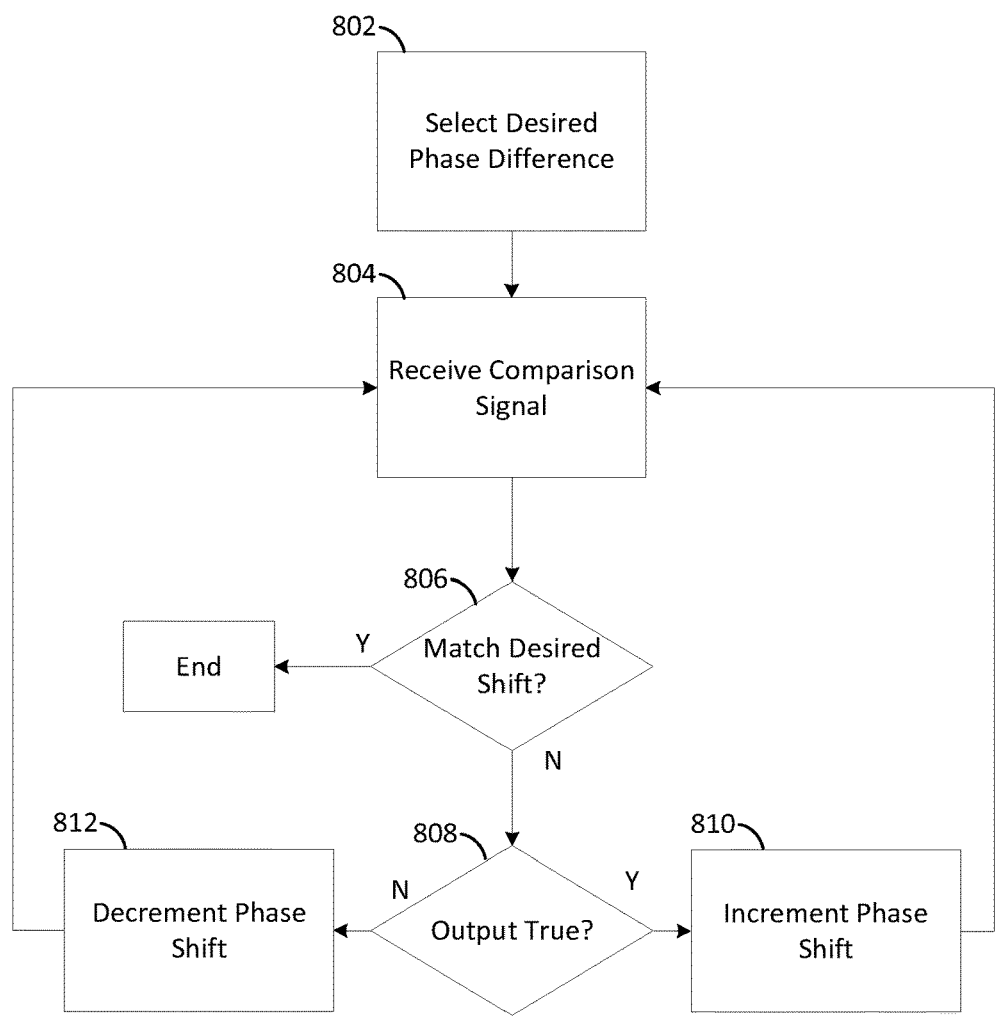
FIG. 8 depicts a non-limiting flow diagram illustrating exemplary methods for adjusting a phase difference of a measured transmitted signal in accordance with some embodiments of the present disclosure.

FIG. 8 depicts steps 800 of a non-limiting flow diagram illustrating exemplary methods for adjusting a phase difference of a measured transmitted signal in accordance with some embodiments of the present disclosure. In an embodiment, the steps of FIG. 8 may be directed to and performed by phase control circuit 500 for identifying a phase difference between a measured transmitted signal and transmission source signal. However, it will be understood that in some embodiments (not depicted in FIG. 8), the phase difference may be identified in other manners, as described herein.

At step 802, a desired phase difference between a phase of the measured transmitted signal and the transmission source signal may be selected, such as selection of a corresponding node of reference signal modification circuit by processing unit 120 when executing antenna tuning instructions 138. Although any desired phase difference may be selected, in some embodiments, processing unit 120 may select the desired phase difference based on a desired communication performance of the antenna 440 of payment reader 22, as may be affected by variations in components of the payment reader 22. In some embodiments, the desired phase difference may be selected to achieve other objectives, such as improving efficiency or otherwise. Processing unit 120 may execute antenna tuning instructions 138 (e.g., including decision circuit 640 implemented in firmware) to provide a modification signal to the reference signal modification circuit 540 selecting a node for a phase reference signal that is proportional to the desired phase difference. The reference signal modification circuit 540 may output a reference signal corresponding to the selected node. After the desired phase difference has been selected, processing may continue to step 804.

At step 804, a comparison signal may be received, such as by decision circuit 640 (e.g., processing unit 120 executing antenna tuning instructions 138). In some embodiments, the comparison signal may be provided from a comparison circuit 620 coupled to compare a reference signal with an analog phase signal as described herein. The analog phase signal may be based on the duty cycle of a phase difference signal output by phase detection circuit 608, which may have a duty cycle that is proportional to a phase difference between the transmission source signal phase and the transmitted signal phase. An amplitude of the analog phase signal also may be proportional to the phase difference between the source signal phase and transmitted signal phase. In this regard, the comparison signal may correspond to the analog phase signal, and may permit a determination that the phase difference between the source signal phase and transmitted signal phase matches a desired phase difference. After the comparison signal has been received, processing may continue to step 806.

At step 806, an evaluation of the comparison signal may be performed by decision circuit 640 (e.g., by processing unit 120 executing antenna tuning instructions 138) to determine whether the phase difference indicated by the analog phase signal matches the desired phase difference within a desired resolution (e.g., as determined by a search technique such as a linear search technique). In an embodiment, if the binary value of the comparison signal has previously been "true" (e.g., high or one), and is now false (e.g., a low or zero), or vice versa, this may indicate that the latest modification of the transmission phase has crossed the value of the desired phase difference. If the resolution of the most recent change is less than a desired minimum value, this may indicate that the phase difference is within a desired value, and processing may end. If not, processing may continue to step 808.

At step 808, an evaluation may be performed, such as by decision circuit 640, of the comparison signal to determine whether a binary value of the comparison signal indicates a manner in which the phase difference should be changed (e.g., based on a search technique such as a linear search technique). For example, at step 808 it may be determined whether the phase shift should be increased or decreased, and in some embodiments, a resolution of how much the value should be increased or decreased (e.g., based on progress of the search technique). If the phase difference is to be increased (e.g., based on a "true" value indicating the current phase difference is less than a desired phase difference), processing may continue to step 810. If the phase difference is to be decreased (e.g., based on a "false" value indicating the current phase difference is greater than a desired phase difference), processing may continue to step 812.

At step 810, the phase difference between the transmitted signal phase and transmission source signal phase may be increased (e.g., by modifying a phase adjustment signal to the phase adjustment circuit 550 such as by incrementing a control signal based on the desired resolution of the phase difference increase) by a value based on an estimate of a phase difference that will match the desired phase difference. Although various increments are possible, in some embodiments, an increment may be selected (e.g., by decision circuit 640) based on a desired search procedure, such as a linear search procedure. In other embodiments, other search procedures may be used (e.g., iteratively stepping a phase difference up or down based on previous phase difference values until the phase difference matches the desired phase difference). For example, decision circuit 640 may increment a value of the phase difference between the measured transmitted signal phase and the transmission source signal phase based on previous values of the comparison signal. In an embodiment, the phase difference may be incremented by a fixed amount (e.g., an amount that is double or other multiple) of the value of a phase difference indicated by one or more previous values of the comparison signal. As an example, if the comparison signal indicates that a phase difference between the measured transmitted signal phase and the transmission source signal phase falls below a desired phase difference of 90 degrees (e.g., based on a previous resolution for phase changes), decision circuit 640 may provide a phase adjustment signal to the phase adjustment circuit 550 to increment a voltage applied to the phase adjustment circuit 550 (e.g., to variable voltage capacitor 438). After the phase shift (e.g., voltage) is incremented, processing may return to step 804.

At step 812, the phase difference between the measured transmitted signal phase and the source signal phase may be decreased (e.g., by modifying a phase adjustment signal to the phase adjustment circuit 550 such as by decrementing a control signal based on the desired resolution of the phase difference increase) by a value based on an estimate of a phase difference that will match the desired phase difference. Similar to the process described above with respect to step 810, decision circuit 640 may decrement a value of the phase difference between the measured transmitted signal phase and the transmission source signal phase based on previous values of the comparison signal. In an embodiment, the phase difference may be decremented by a fixed amount (e.g., an amount that is one half or other proportion) of the value of the phase difference indicated by one or more previous values of the comparison signal. As an example, if the comparison signal indicates that a phase difference between the measured transmitted signal phase and the transmission source signal phase exceeds a desired phase difference of 90 degrees (e.g., based on a previous resolution for phase changes), decision circuit 640 may provide a phase adjustment signal to the phase adjustment circuit 550 to decrement a voltage applied to the phase adjustment circuit 550 (e.g., to variable voltage capacitor 438). After the phase shift (e.g., voltage) is incremented, processing may return to step 804.

Figure 9:
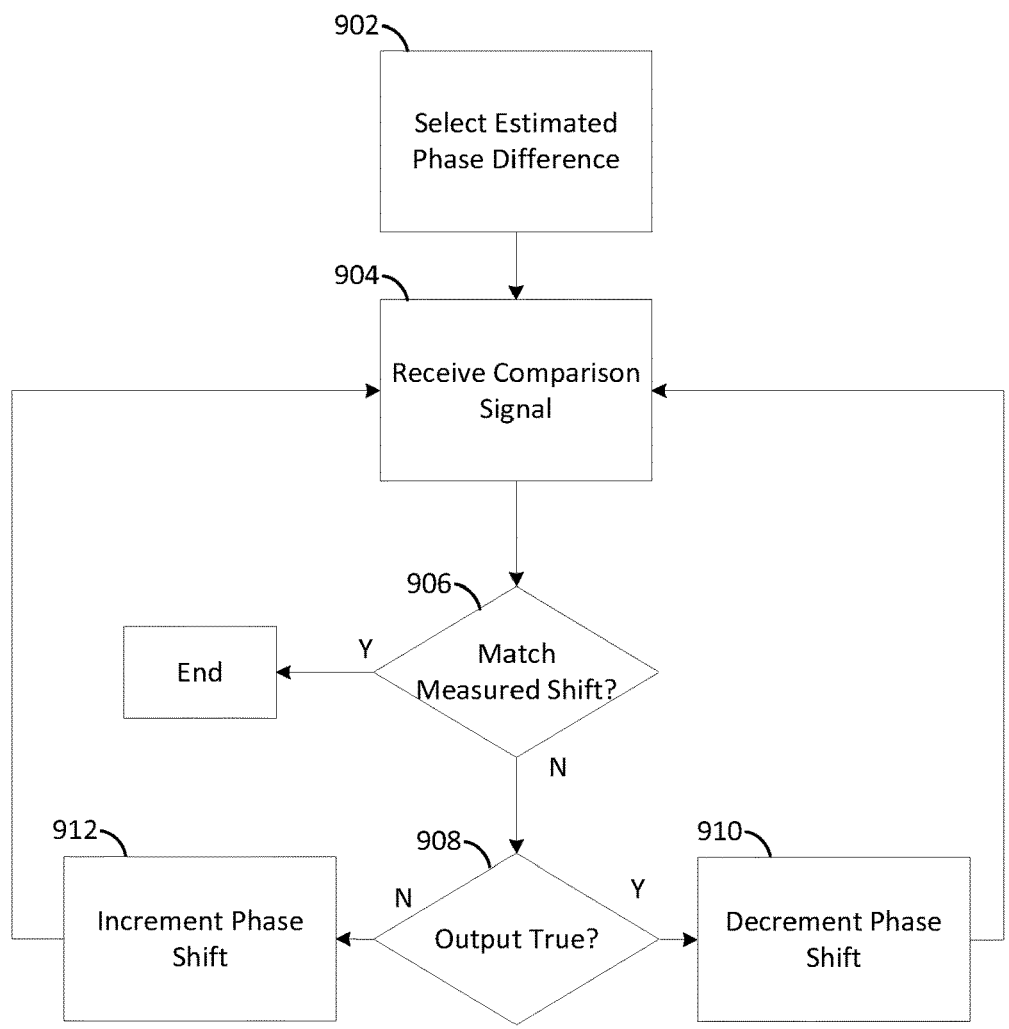
FIG. 9 depicts a non-limiting flow diagram illustrating exemplary methods for identifying a measured phase difference in accordance with some embodiments of the present disclosure.

FIG. 9 depicts steps 900 of a non-limiting flow diagram illustrating exemplary methods for identifying a measured phase difference in accordance with some embodiments of the present disclosure. In an embodiment, the steps of FIG. 9 may be directed to and performed by phase control circuit 500 for identifying a phase difference between a measured transmitted signal and transmission source signal. However, it will be understood that in some embodiments (not depicted in FIG. 9), the measured phase difference may be identified in other manners, as described herein.

At step 902, an estimated phase difference between a phase of the measured transmitted signal and the transmission source signal may be selected, such as selection of a corresponding node of reference signal modification circuit 540 by processing unit 120 when executing antenna tuning instructions 138. Although any estimated phase difference may be selected, in some embodiments, processing unit 120 may select the estimated phase difference to attempt to match the phase difference of the analog phase signal (e.g., as indicated by a voltage of the analog phase signal), such as for performing calibration, monitoring communication performance of the antenna 440 of payment reader 22 or otherwise. In some embodiments, the estimated phase difference may be selected to achieve other objectives, such as improving efficiency. Processing unit 120 may execute antenna tuning instructions 138 (e.g., including decision circuit 640 implemented in firmware) to provide a modification signal to the reference signal modification circuit 540 selecting a node for a reference signal that is proportional to the estimated phase difference. The reference signal modification circuit 540 may output a reference signal corresponding to the selected node. After the estimated phase difference has been selected, processing may continue to step 904.

At step 904, a comparison signal may be received, such as by decision circuit 640 (e.g., processing unit 120 executing antenna tuning instructions 138). In some embodiments, the comparison signal may be provided from a comparison circuit 620 coupled to compare a reference signal with an analog phase signal as described herein. The analog phase signal may be based on the duty cycle of a phase difference signal output by phase detection circuit 608, which may have a duty cycle that is proportional to a phase difference between the transmission source signal phase and the transmitted signal phase. An amplitude of the analog phase signal also may be proportional to the phase difference between the source signal phase and transmitted signal phase, and the comparison signal may be based on a comparison of this analog phase signal to the reference signal. After the comparison signal has been received, processing may continue to step 906.

At step 906, an evaluation of the comparison signal may be performed by decision circuit 640 (e.g., by processing unit 120 executing antenna tuning instructions 138) to determine whether the phase difference indicated by the reference signal matches the measured phase difference of the analog phase signal within a desired resolution (e.g., as determined by a search technique such as a linear search technique). In an embodiment, if the binary value of the comparison signal has previously been "true" (e.g., high or one), and is now false (e.g., a low or zero), or vice versa, this may indicate that the latest modification of the reference signal value has crossed the value of the actual phase difference as indicated by the analog phase signal. If the resolution of the most recent change is less than a desired minimum value, this may indicate that the phase difference is within a desired value, and processing may end. If not, processing may continue to step 808.

At step 908, an evaluation may be performed, such as by decision circuit 640, of the comparison signal to determine whether a binary value of the comparison signal indicates a manner in which the reference signal value should be changed (e.g., based on a search technique such as a linear search technique). For example, at step 908 it may be determined whether the reference signal value should be increased or decreased, and in some embodiments, a resolution of how much the value should be increased or decreased (e.g., based on progress of the search technique). If the reference signal value is to be increased (e.g., based on a "true" value indicating the current phase difference is less than a desired phase difference), processing may continue to step 910. If the phase difference is to be decreased (e.g., based on a "false" value indicating the current phase difference is greater than a desired phase difference), processing may continue to step 912.

At step 910, the reference voltage value may be decreased (e.g., by providing a modification signal to the reference signal modification circuit 540) based on an estimate of a phase difference that will match the desired phase difference. Although various increases (e.g., by incrementing) are possible, in some embodiments, an increment may be selected (e.g., by decision circuit 640) based on a desired search procedure, such as a linear search procedure. In other embodiments, other search procedures may be used (e.g., iteratively stepping a phase difference up or down based on previous phase difference values until the phase difference matches the desired phase difference). For example, decision circuit 640 may decrement a value corresponding to a change in reference value based on previous values of the comparison signal. In an embodiment, the phase difference may be decremented by a fixed amount (e.g., an amount that is double or other multiple) of the value of a phase difference indicated by one or more previous values of the comparison signal. As an example, if the comparison signal indicates that a phase difference between the reference signal and the analog phase signal falls below a desired resolution (e.g., based on a previous resolution for phase changes), decision circuit 640 may provide a modification signal to the reference signal modification circuit 540 to decrement a voltage of the reference signal provided to comparison circuit 620. After the reference value is decreased, processing may return to step 904.

At step 912, the measured phase difference may be increased (e.g., by incrementing a modification signal provided to the reference signal modification circuit 540) by a value based on an updated estimated reference value that will correspond to the measured phase difference as indicated by the analog phase signal. Similar to the process described above with respect to step 910, decision circuit 640 may increment a value of the estimated phase difference based on previous values of the comparison signal. In an embodiment, the estimated phase difference may be incremented by a fixed amount (e.g., an amount that is double or other multiple) of the value of the estimated phase difference indicated by one or more previous values of the comparison signal. After the reference value is increase, processing may return to step 904.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for measuring a phase difference of a near field communication (NFC) transmission circuit, comprising:
   a processing unit to provide a transmission source signal having a source signal phase;
   a tuning circuit coupled to the processing unit to provide a tuned transmission signal from the transmission source signal;
   an antenna coupled to the tuning circuit to transmit the tuned transmission signal;
   a sense circuit coupled to the antenna to measure the transmitted signal, wherein the transmitted signal has a transmitted signal phase;
   a phase detection circuit, comprising:
     a measured signal input coupled to receive a first signal representative of the measured transmitted signal;
     a source signal input coupled to receive a second signal representative of the transmission source signal; and
     a phase detection output to output a phase difference signal based on a comparison of the first signal and the second signal, wherein a duty cycle of the phase difference signal changes based on whether the first signal and the second signal are associated with different logical values, and wherein the duty cycle of the phase difference signal is proportional to a phase difference between the source signal phase and the transmitted signal phase; and
   an analog filtering circuit coupled to the phase detection circuit to generate an analog phase signal based on the duty cycle of the phase difference signal, wherein an amplitude of the analog phase signal is proportional to the phase difference between the source signal phase and the transmitted signal phase.

2. The system of claim 1, further comprising:
a comparison circuit to compare the analog phase signal to a reference signal; and
a decision circuit to adjust operation of one or more components of the system based on the comparison.

3. The system of claim 2, further comprising a phase adjustment circuit coupled to the antenna, wherein the decision circuit provides a signal to the phase adjustment circuit that adjusts the phase of the transmitted signal.

4. The system of claim 3, wherein the phase adjustment circuit comprises an adjustable capacitor.

5. A system for identifying a phase difference within a wireless transmission circuit, comprising:
a processing unit to provide a transmission source signal having a source signal phase;
a tuning circuit coupled to the processing unit to provide a tuned transmission signal from the transmission source signal;
an antenna coupled to the tuning circuit to transmit the tuned transmission signal;
a sense circuit coupled to the antenna to measure the transmitted signal, wherein the transmitted signal has a transmitted signal phase;
a phase detection circuit, comprising:
a measured signal input coupled to receive a first signal representative of the measured transmitted signal;
a source signal input coupled to receive a second signal representative of the transmission source signal; and
a phase detection output to output a phase difference signal based on a comparison of the first signal and the second signal, wherein a duty cycle of the phase difference signal changes based on the relative values of the first signal and the second signal, and wherein the duty cycle of the phase difference signal is proportional to a phase difference between the source signal phase and the transmitted signal phase; and
a circuit coupled to the phase detection circuit to generate an analog phase signal based on the duty cycle of the phase difference signal, wherein an amplitude of the analog phase signal is proportional to the phase difference between the source signal phase and the transmitted signal phase.

6. The system of claim 5, further comprising a phase adjustment circuit coupled to the antenna, wherein the phase adjustment circuit adjusts the phase of the transmitted signal based on the phase difference signal.

7. The system of claim 6, wherein the phase adjustment circuit comprises an adjustable capacitor.

8. The system of claim 6, further comprising a decision circuit to provide a phase adjustment signal to the phase adjustment circuit based on the phase difference signal, and wherein the phase adjustment signal is based on an estimate of the phase difference.

9. The system of claim 8, wherein the decision circuit is coupled to the circuit to receive the analog phase signal from the circuit, and wherein the decision circuit provides the phase adjustment signal based on the analog phase signal.

10. The system of claim 9, further comprising a comparison circuit to compare the analog phase signal to a reference signal, wherein the phase adjustment signal is based on the comparison of the analog phase signal to the reference signal, and wherein the reference signal is proportional to a desired phase difference.

11. The system of claim 10, wherein the phase adjustment signal is determined based on previous values of the comparison signal according to a linear search procedure.

12. The system of claim 5, further comprising a comparison circuit coupled to the circuit to receive the analog phase signal, to compare the analog phase signal to a reference signal, and to output a comparison signal, wherein the comparison signal is based on the comparison of the analog phase signal to the reference signal, and wherein the reference signal is proportional to a known phase difference.

13. The system of claim 12, further comprising:
a reference signal modification circuit to modify a value of the reference signal based on a modification signal; and
a decision circuit coupled to the comparison circuit to provide the modification signal to the reference signal modification circuit based on the comparison signal.

14. The system of claim 13, wherein the modification signal is determined based on a current value of the reference signal and previous values of the comparison signal according to a linear search procedure.

15. The system of claim 13, wherein the decision circuit modifies the reference signal until the reference signal is within a threshold voltage of the analog phase signal, and wherein the value of modified reference signal corresponds to a measured phase difference.

16. The system of claim 15, wherein the threshold voltage is based on a known resolution for the reference signal modification circuit.

17. The system of claim 12, wherein the circuit comprises one or more notch filters, wherein each notch filter has a stopband at a carrier frequency associated with the transmitted signal, and wherein the analog phase signal is generated based on the one or more notch filters.

18. The system of claim 17, wherein the circuit comprises one or more low-pass filters, and wherein the analog phase signal is generated based on the one or more low-pass filters.

19. The system of claim 5, wherein the first signal and the second signal are associated with different logical values.

20. The system of claim 5, further comprising a processing circuit to remove noise from the measured transmitted signal to output the first signal and to remove noise from the transmission source signal to output the second signal.

21. A method for identifying a phase difference within a wireless transmission circuit, comprising:
providing, from a processing unit, a transmission source signal having a source signal phase;
providing, from a tuning circuit coupled to the processing unit, a tuned transmission signal based on the transmission source signal;
transmitting, from an antenna coupled to the tuning circuit, the tuned transmission signal;
measuring, from a sense circuit coupled to the antenna, the transmitted signal, wherein the transmitted signal has a transmitted signal phase;
receiving, at a measured signal input of a phase detection circuit, a first signal representative of the measured transmitted signal;
receiving, at a source signal input of the phase detection circuit, a second signal representative of the transmission source signal; and
outputting, from an output of the phase detection circuit, a phase difference signal based on a comparison of the first signal and the second signal, wherein a duty cycle of the phase difference signal changes based on the relative values of the first signal and the second signal, and wherein the duty cycle of the phase difference signal is proportional to a phase difference between the source signal phase and the transmitted signal phase; and generating, at an analog filtering circuit coupled to the phase detection circuit, an analog phase signal based on the duty cycle of the phase difference signal, wherein an amplitude of the analog phase signal is proportional to the phase difference between the source signal phase and the transmitted signal phase.

22. The method of claim 21, further comprising:
adjusting, by a phase adjustment circuit coupled to the antenna, the phase of the transmitted signal based on the phase difference signal.

23. The method of claim 22, further comprising:
providing, from a decision circuit, a phase adjustment signal to the phase adjustment circuit based on the phase difference signal, wherein the phase adjustment signal is based on an estimate of the phase difference.

24. The method of claim 23, further comprising:
providing, from the analog filtering circuit, the analog phase signal to the decision circuit; and
providing, from the decision circuit, the phase adjustment signal based on the analog phase signal.

25. The method of claim 24, further comprising:
generating, at a comparison circuit, a comparison signal based on a comparison of the analog phase signal to a reference signal; and
providing the comparison signal to the decision circuit, wherein the phase adjustment signal is based on the comparison of the analog phase signal to the reference signal, and wherein the reference signal is proportional to a desired phase difference.

26. The method of claim 25, further comprising:
determining, at the decision circuit, the phase adjustment signal based on previous values of the comparison signal according to a linear search procedure.

27. The method of claim 21, further comprising:
providing the analog phase signal to a comparison circuit;
comparing, at the comparison circuit, the analog phase signal to a reference signal; and
outputting the comparison signal from the comparison circuit, wherein the comparison signal is based on the comparison of the analog phase signal to the reference signal, and wherein the reference signal is proportional to a known phase difference.

28. The method of claim 27, further comprising:
receiving, at the decision circuit, the comparison signal;
providing, from the decision circuit based on the comparison signal, a modification signal to a reference signal modification circuit; and
modifying, at the reference signal modification circuit, a value of the reference signal based on the modification signal.

29. The method of claim 28, further comprising determining the modification signal based on a current value of the reference signal and previous values of the comparison signal according to a linear search procedure.

30. The method of claim 29, further comprising modifying, at the decision circuit, the reference signal until the reference signal is within a threshold voltage of the analog phase signal, wherein a value of the modified reference signal corresponds to a measured phase difference.

* * * * *